United States Patent
Markovich et al.

(10) Patent No.: US 7,592,397 B2
(45) Date of Patent: *Sep. 22, 2009

(54) CAP LINERS, CLOSURES, AND GASKETS FROM MULTI-BLOCK POLYMERS

(75) Inventors: Ronald P. Markovich, Houston, TX (US); Dale M. Elley-Bristow, Sarnia (CA); Miguel A. Prieto, Richterswil (CH); Russell P. Barry, Samstagern (CH); Felipe Martinez, Houston, TX (US); Daniel J. Falla, Sarnia (CA); Julien H. J. M. Damen, Mettmenstetten (CH)

(73) Assignee: Dow Global Technologies Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/908,951

(22) PCT Filed: Mar. 15, 2006

(86) PCT No.: PCT/US2006/009501

§ 371 (c)(1),
(2), (4) Date: May 21, 2008

(87) PCT Pub. No.: WO2006/113000

PCT Pub. Date: Oct. 26, 2006

(65) Prior Publication Data

US 2008/0269388 A1    Oct. 30, 2008

(51) Int. Cl.
*C08F 8/00* (2006.01)
*C08L 9/00* (2006.01)
*C08L 23/04* (2006.01)

(52) U.S. Cl. ............... 525/236; 525/191; 525/232; 525/240

(58) Field of Classification Search ........... 521/50, 521/144; 526/72; 525/232, 236
See application file for complete search history.

(56) References Cited

U.S. PATENT DOCUMENTS

| | | | |
|---|---|---|---|
| 3,873,642 A | 3/1975 | Jezl | |
| 4,798,081 A * | 1/1989 | Hazlitt et al. | 73/53.01 |
| 5,468,810 A | 11/1995 | Hayakawa et al. | |
| 5,594,080 A | 1/1997 | Waymouth et al. | |
| 5,610,253 A | 3/1997 | Hatke et al. | |
| 5,733,980 A | 3/1998 | Cozewith et al. | |
| 5,798,420 A | 8/1998 | Cozewith et al. | |
| 5,969,070 A | 10/1999 | Waymouth et al. | |
| 6,114,457 A | 9/2000 | Markel et al. | |
| 6,147,180 A | 11/2000 | Markel et al. | |
| 6,160,029 A * | 12/2000 | Chaudhary et al. | 521/139 |
| 6,262,203 B1 | 7/2001 | Chien et al. | |
| 6,455,638 B2 * | 9/2002 | Laughner et al. | 525/191 |
| 6,566,544 B1 | 5/2003 | Waymouth et al. | |
| 2003/0027954 A1* | 2/2003 | Becke et al. | 526/126 |
| 2004/0121922 A1 | 6/2004 | Okada et al. | |

FOREIGN PATENT DOCUMENTS

| | | |
|---|---|---|
| EP | 0 274 906 A2 | 7/1998 |
| EP | 0 958 313 B1 | 9/2002 |
| EP | 1 262 498 A2 | 12/2002 |
| JP | 2002-206007 | 7/2002 |
| JP | 2004-204058 | 7/2004 |
| WO | WO 95/27745 A1 | 10/1995 |
| WO | WO 95/27746 A1 | 10/1995 |
| WO | WO 98/34970 A1 | 8/1998 |
| WO | WO 99/35171 A1 | 7/1999 |
| WO | WO 00/37514 A1 | 6/2000 |
| WO | WO 02/066540 A2 | 8/2002 |
| WO | WO 03/014046 A1 | 2/2003 |

* cited by examiner

*Primary Examiner*—Mark Eashoo
*Assistant Examiner*—Melissa Winkler

(57) ABSTRACT

A polymer composition comprises at least an ethylene/α-oleiln interpolymer and at least one other polymer. The other polymer can be selected from a second ethylene/α-olefin interpolymer, an elastomer, a polyolefin, a polar polymer, and an ethylene/carboxylic acid interpolymer or ionomer thereof. The ethylene/α-olefin interpolymer is a block copolymer having at least a hard block and at least a soft block. The soft block comprises a higher amount of comonomers than the hard block. The block interpolymer has a number of unique characteristics disclosed here. Also provided are gaskets, bottle cap liners, and closures that comprise or obtained from a compositon comprising at least one ethylene/α-olefin interpolymer and at least one polyolefin. The gaskets are capable of compression sealing various containers, without contaminating the contents. Liquid containers particularly benefit from the use of the novel gasket materials disclosed herein.

13 Claims, 7 Drawing Sheets

CAP LINERS, CLOSURES, AND GASKETS FROM MULTI-BLOCK POLYMERS

FIELD OF THE INVENTION

The invention relates to polymer blend compositions comprising at least one ethylene/α-olefin polymer and a second polymer which is different from the ethylene/α-olefin polymer. In particular, this invention relates to gaskets, cork closures, and bottle cap liners comprising or obtainable from the blend compositions.

BACKGROUND OF THE INVENTION

Gaskets have been made from a variety of structural materials, including polymers such as ethylene/vinyl acetate (EVA) and polyvinyl chloride (PVC). For example, U.S. Pat. No. 4,984,703 discloses plastic closures which have a sealing liner comprising a blend of ethylene/vinyl acetate and a thermoplastic elastomeric composition.

Depending on the use environment, gaskets can have varying degrees of properties. For example, in corrosive service conditions, the gasket should be impervious to the material in question, but still resilient enough to form a seal. Gaskets used in the food and beverage area have similar requirements, but cannot contaminate the foodstuff. For example, when a gasket is used as a bottle cap closure liner and the closure is applied and removed (and/or resealed), it is desirable for the gasket to retain its integrity and not shred or tear (known in the industry as "stringing" or "scuffing") such that pieces of it contaminate the foodstuff. Further, the gasket or closure liner should not deform such that it loses its seal integrity. Depending upon the type of food and/or liquid contents, the filling temperature might be lower or higher than room temperature, thus placing even greater demands on the gasket.

While there have been many different gasket materials, there continues to exist a need for olefin polymers and olefin polymer compositions useful in making gasket materials, and in the case of foodstuff, without adversely contributing to the taste and/or odor of the product.

SUMMARY OF THE INVENTION

The aforementioned needs are met by various embodiments of the invention. In some embodiments, the polymer blend compositions comprises:

(A) at least one ethylene/α-olefin interpolymer and (B) at least one other polymer which is a different component than the ethylene/α-olefin interpolymer, wherein the ethylene/α-olefin interpolymer:

(a) has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m > -2002.9 + 4538.5(d) - 2422.2(d)^2, \text{ or}$$

(b) has a $M_w/M_n$ from about 1.7 to about 3.5, and is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1; or (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (g) an average block index greater than zero and up to about 1.0 and a molecular weight distribution, Mw/Mn, greater than about 1.3.

In the polymer compositions, the other polymer is selected from a second ethylene/α-olefin interpolymer, an elastomer, a polyolefin, a polar polymer, and an ethylene/carboxylic acid interpolymer or ionomer thereof. When the other polymer is a second ethylene/α-olefin interpolymer, the two ethylene/α-olefin interpolymers in the polymer blend compositions are different in comonomer content, molecular weight, structure, etc. Moreover, the two ethylene/α-olefin interpolymers can differ in melt index and/or overall density.

In some embodiments, the first ethylene/α-olefin interpolymer in the polymer blend compositions is present in an amount ranging from about 1% to about 99.5%, 5% to about 99.5%, 9% to 99.5%, 20% to about 80% or 10% to about 70% and the other polymer is present in an amount ranging from about 1% to about 99.5%, 5% to about 99.5%, 9% to 99.5%, 20% to about 80% or 10% to about 70% by total weight of the composition.

The ethylene/α-olefin interpolymers used in the polymer blend compositions have the processability similar to highly branched low density polyethylene (LDPE), but the strength and toughness of linear low density polyethylene (LLDPE). However, the ethylene/α-olefin polymers are distinctly different from traditional Ziegler polymerized heterogeneous polymers (e.g., LLDPE) and are also different from traditional free radical/high pressure polymerized highly branched LDPE, and different from metallocene or single site catalyzed polymers. This difference is believed to arise from the blocked nature of the interpolymer backbone. That is, nearly every interpolymer molecule has a segment of essentially linear monomer (e.g., high density polyethylene having little or no short chain branching from comonomer incorporation) alternating with a segment of highly short chain branched ethylene/α-olefin (e.g., from higher incorporation of α-olefin comonomer). This blocked nature of the backbone leads the interpolymers to have surprising performance, especially with regard to high temperature performance for such beneficial properties such as abrasion resistance, and the interpolymers have a melting points higher than that of traditional polyethylene, and random interpolymers of ethylene/α-olefins at the same or similar densities. For example, blocked interpolymers useful in embodiments of the invention having an overall density of about 0.9 g/cm$^3$ have a melting point of about 120° C., whereas a Ziegler-Natta polymerized ethylene polymer (traditionally labeled LLDPE) having about the same density have a melting point of about 122° C., and a random ethylene/alpha-olefin interpolymer (such as that made using metallocene or single site catalysis) having about the same density have a melting point of about 90° C.

In some embodiments, the other polymer is an elastomer selected from a thermoplastic vulcanizate, block copolymer, neoprene, functionalized elastomers, polybutadiene rubber, butyl rubber or a combination thereof. In some embodiments, the other polymer is a polyolefin selected from LDPE, LLDPE, HDPE, EVA, EAA, EMA, ionomers thereof, metallocene LLDPE, impact grade propylene polymers, random grade propylene polymers, polypropylene and a compbination thereof. In some embodiments, the other polymer is a polar polymer selected from nylon, polyamide, ethylene vinyl acetate, polyvinyl chloride, acrylonitrile/butadiene/styrene (ABS) copolymers, aromatic polycarbonates, ethylene/carboxylic acid copolymers, acrylics and a combination thereof. In other embodiments, the other polymer is a olefin/carboxylic acid interpolymer selected from ethylene-acrylic acid copolymers, ethylene-methacrylic acid copolymers, ethylene-itaconic acid copolymers, ethylene-methyl hydrogen maleate copolymers, ethylene-maleic acid copolymers, ethylene-acrylic acid copolymers, ethylene-methacrylate copolymers, ethylene-methacrylic acid-ethacrylate copolymers, ethylene-itaconic acid-methacrylate copolymers, ethylene-itaconic acid-methacrylate copolymers, ethylene-methyl hydrogen maleate-ethyl acrylate copolymers, ethylene-methacrylic acid-vinyl acetate copolymers, ethylene-acrylic acid copolymers, ethylene-acrylic acid-vinyl alcohol copolymers, ethylene-acrylic acid-carbon monoxide copolymers, ethylene-propylene-acrylic acid copolymers, ethylene-methacrylic acid-acrylonitrile copolymers, ethylene-fumaric acid-vinyl methyl ether copolymers, ethylene-vinyl chloride-acrylic acid copolymers, ethylene-vinylidene chloride-acrylic acid copolymers, ethylene-vinylidene chloride-acrylic acid copolymers, ethylene-vinyl fluoride-methacrylic acid copolymers, ethylene-chlorotrifluoroethlyene-methacrylic acid copolymers and a combination thereof.

The polymer composition may further comprise an additive selected from a slip agent, anti-blocking agent, plasticizer, antioxidant, UV stabilizer, colorant, pigment, filler, lubricant, antifogging agent, flow aid, coupling agent, cross-linking agent, nucleating agent, surfactant, solvent, flame retardant, antistatic agent, oil extender, odor absorber, barrier resin. The slip agent may be selected from polymethylsiloxane, erucamide, oleamide and a combination thereof. The extender may be a mineral oil, polybutene, siloxane, or a combination thereof. The odor absorber can be calcium carbonate, activated charcoal or a combination thereof. The barrier resin used herein can be selected from EVOH, PVDC and a combination thereof.

Also provided are articles comprising the polymer compostions. One exemplary artcle is a gasket comprising the composition provided herein. The ethylene/α-olefin interpolymers in the compositions have an unusual combination of properties, making them especially useful for gasket materials comprising the compositions. Preferably, the ethylene/α-olefin interpolymer is an ethylene/$C_3$-$C_{20}$ alpha-olefin interpolymer. In some embodiments, the other polymer in the gasket comprises the ethylene/carboxylic acid interpolymer or ionomer thereof in an amount from about 4 percent to about 12 percent by weight of total composition. The ethylene/carboxylic acid interpolymer can have an acid content from about 3 percent by weight of the interpolymer to about 50 percent by weight of the interpolymer.

In some embodiments, the gasket comprises a slip agent that comprises a primary amide agent and a secondary amide agent, together comprising from about 0.05 percent by weight of the total composition to about 5 percent by weight of the total composition. The primary amide agent can be present at a level at least twice that of the secondary amide agent. In some embodiments, the slip agent comprises a silane compound.

In other embodiments, the gasket is foamed using a foaming agent, such as physical blowing agents, gaseous blowing agents and chemical blowing agents. The chemical blowing agents include, but are not limited to, sodium bicarbonate, dinitrosopentamethylenetetramine, sulfonyl hydrazides, azodicarbonamide, p-toluenesulfonyl semicarbazide, 5-phenyltetrazole, diisopropylhydrazodicarboxylate, 5-phenyl-3,6-dihydro-1,3,4-oxadiazin-2-one, and sodium borohydride.

In yet other embodiments, the foaming agent is a gaseous blowing agent selected from the group consisting of carbon dioxide and nitrogen. In another embodiment, the foaming agent is a physical blowing agent selected from a group consisting of pentanes, hexanes, heptanes, benzene, toluene, dichloromethane, trichloromethane, trichloroethylene, tetrachloromethane, 1,2-dichloroethane, trichlorofluoromethane, 1,1,2-trichlorotrifluoroethane, methanol, ethanol, 2-propanol, ethyl ether, isopropyl ether, acetone, methyl ethyl ketone, and methylene chloride; isobutane and n-butane, 1,1-difluoroethane.

In some embodiments, the ethelyne/α-olefin interpolymer in the gasket provided herein comprises from about 25 to about 35% by weight of the composition, the other polymer comprises from about 55 to about 65% by weight of the composition, and the slip agent comprises from about 1 to about 3% by weight of the composition.

In other embodiments, the gasket comprises the polymer composition provided herein that has either a static coefficient of friction or a dynamic coefficient of friction, or both, of less than about 1 or of about 0.6 or less.

In some embodiments, the compostion has a melt index greater than or equal to about 5 g/10 minutes and a 70° C. compression set of less than 70% and and change in compression set between 23° C. and 70° C. is less than 55%.

In other embodiments, the gasket provided herein comprises the polymer composition that comprises at least one ethylene/α-olefin interpolymer at about 80 to about 97.5 weight percent of the total weight of the composition; about 2 to about 15 weight percent of at least one ethylene/carboxylic acid interpolymer or ionomer thereof and at least one slip agent, wherein the weight percentage of the two interpolymers are based on the total weight of composition.

Additional aspects of the invention and characteristics and properties of various embodiments of the invention become apparent with the following description.

DESCRIPTION OF EMBODIMENTS OF THE INVENTION

General Definitions

Figure 1:
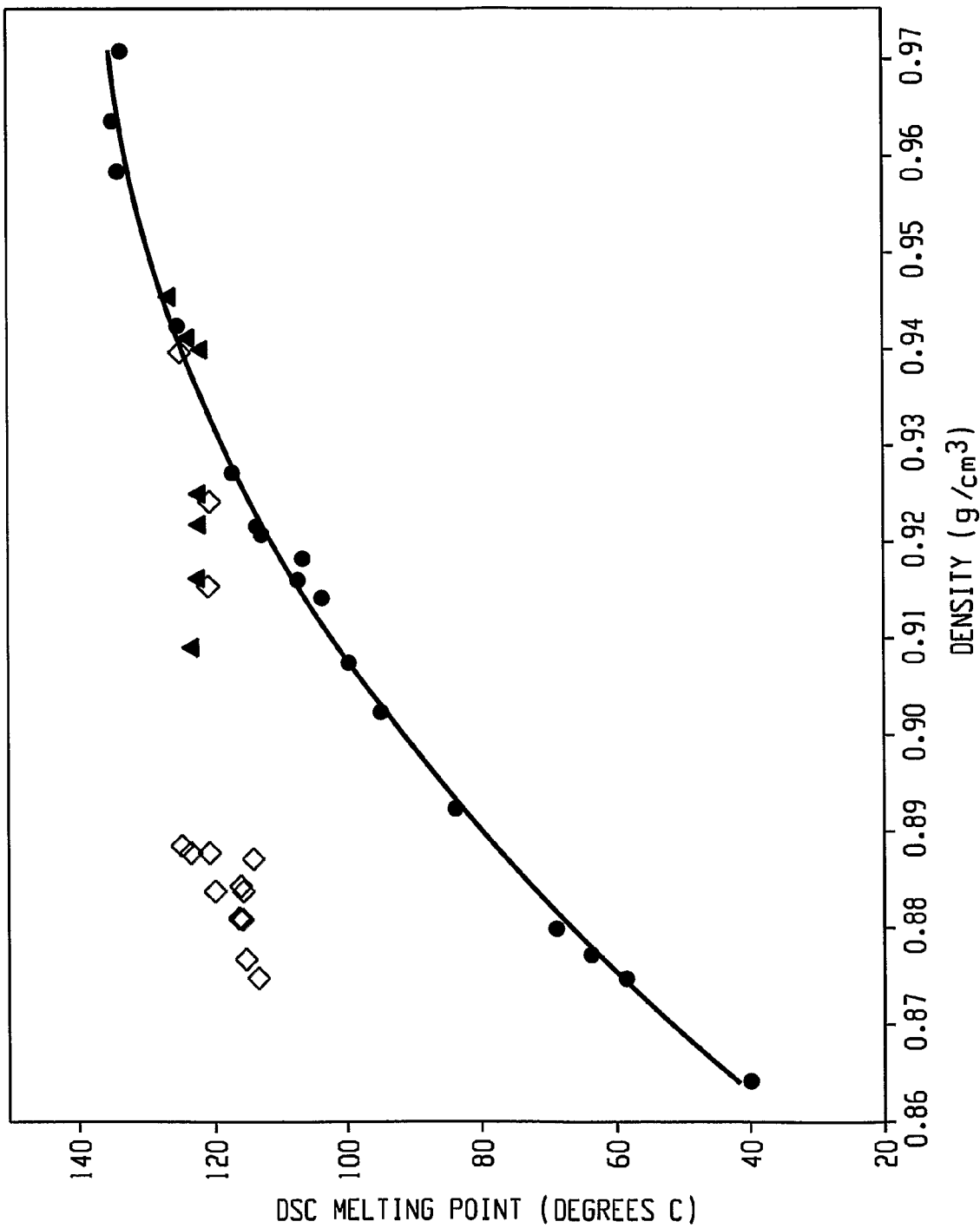
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" refers to polymers with ethylene being the majority mole fraction of the whole polymer. Preferably, ethylene comprises at least 50 mole percent of the whole polymer, more preferably at least 60 mole percent, at least 70 mole percent, or at least 80 mole percent, with the reminder of the whole polymer comprising at least another comonomer. For ethylene/octene copolymers, the preferred composition includes an ethylene content greater than about 80 mole percent with a octene content of equal to or less than about 20 mole percent. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and constitute the major component of a polymerization process.

The ethylene/α-olefin interpolymers comprise ethylene and one or more copolymerizable α-olefin comonomers in polymerized form, characterized by multiple (i.e., two or more) blocks or segments of two or more polymerized monomer units differing in chemical or physical properties (block interpolymer), preferably a multi-block copolymer. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion. "Hard" segments refer to blocks of polymerized units in which ethylene is present in an amount greater than 95 weight percent, and preferably greater than 98 weight percent. In other words, the comonomer content in the hard segments is less than 5 weight percent, and preferably less than 2 weight percent. In some embodiments, the hard segments comprises all or substantially all ethylene. "Soft" segments, on the other hand, refer to blocks of polymerized units in which the comonomer content is greater than 5 weight percent, preferably greater than 8 weight percent, greater than 10 weight percent, or greater than 15 weight percent. In some embodiments, the comonomer content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

In some embodiments, A blocks and B blocks are randomly distributed along the polymer chain. In other words, the block copolymers do not have a structure like:

In other embodiments, the block copolymers do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

The term "polar polymer" or "polar interpolymer" refers to a polymer that includes at least one polar monomer. A polar monomer is a polymerizable ethylenically unsaturated compound bearing a polar group having a group moment in the range from about 1.4 to about 4.4 Debye units as determined by Smyth, C. P., Dielectric Behavior and Structure, McGraw-Hill Book Company, Inc., New York (1955). Exemplary polar groups include —CN, —NO$_2$, —OH, —Br, —Cl, —NH$_2$, —C(O)OR and —OC(O)R wherein R is alkyl or aryl. Preferably, the polar monomer is an ethylenically unsaturated nitrile such as acrylonitrile, methacrylonitrile and fumaronitrile, and alkyl esters of α, β-ethylenically unsaturated acids, e.g., alkyl acrylates and methacrylates, methyl acrylate, butyl acrylate and methyl methacrylate, with acrylonitrile and methyl methacrylate being most preferred.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide various polymer blend compositons and gaskets, bottle cap liners, and enclosures made therefrom. The polymer compositions comprise at least one ethylene/α-olefin interpolymer and at least one other polymer which is different than the ethylene/α-olefin interpolymer. The other polymer can be a second ethylene/α-olefin interpolymer, an elastomer, a polyolefin, a polar polymer, and an ethylene/carboxylic acid interpolymer or an ionomer thereof. When the other polymer is a second ethylene/α-olefin interpolymer, the two ethylene/α-olefin interpolymers in the polymer blend compositions are different. The polymer blends possess unique physical and mechanical properties that are suitable for making molded articles for a variety of applications. Preferably, the ethylene/α-olefin interpolymers are a multi-block copolymer comprising at least one soft block and at least one hard block. In some embodiments, the blends have relatively low modulus, while maintaining relatively high heat resistance. Such balance of properties makes the blended suitable for making flexible molded articles. The molded articles should have an upper use or service temperature of at least 40° C., at least 50° C., at least 60° C., at least 80° C., or at least 90° C.

The term "different" when referring to two polymers means that the two polymers differ in composition (monomer or comonomer type, monomer or comonomer content, etc.), structure, property, or a combination thereof. Two polymers also are considered different if they have a different molecular weight, even though they have the same structure and composition. Conversely, two polymer are considered different if they have a different structure even if they have the same composition and molecular weight. For example, a homogeneous ethylene/octene copolymer made by a metallocene catalyst is different than a heterogeneous ethylene/octene copolymer made by a Ziegler-Natta catalyst, even if they have identical comonomer content and molecular weight. Moreover, two ethylene/α-olefin interpolymers can differ in the melt index and/or overall density.

Some gaskets should withstand temperatures higher than room temperature (about 25° C.) for brief times, particularly where the application is a "hot fill" application. For example, products which undergo pasteurization should have gaskets that have melting points greater than 100° C. Because the ethylene/α-olefin interpolymers described below have a unique melting point-density relationship, such interpolymers with a wide range of densities can be used to make gaskets. In contrast to homogeneously branched linear or homogeneously branched substantially linear olefin polymers which have lower melting points as density lowers, the ethylene/α-olefin interpolymers used in embodiments of the invention have melting points substantially independent of density.

The density of the ethylene/α-olefin interpolymers used in embodiments of the invention is measured in accordance with ASTM D-792 and is generally from about 0.85 g/cm$^3$ to about 0.96 g/cm$^3$, preferably from about 0.87 g/cm$^3$ to about 0.92 g/cm$^3$, and especially from about 0.89 g/cm$^3$ to about 0.915 g/cm$^3$.

The Food and Drug Administration (FDA) currently limits hexane extractables for polyethylene for food contact to not more than 5.5%. The method is described in FDA regulation 21 CFR Ch. 1 (Apr. 1, 1994 Edition) §177.1520, pages 252-253. Even though molecular weight distribution influences hexane extractables, larger amounts of comonomer, especially for heterogeneous polyethylene copolymers, causes higher levels of hexane extractables. For example, heterogeneous ethylene/1-octene linear polyethylene having densities from about 0.9017 to about 0.91 g/cm$^3$ generally have hexane extractables greater than 5%. In contrast, ethylene/1-octene copolymers described below having densities at least as low as about 0.8976 g/cm$^3$ have hexane extractables less than 5%, preferably less than about 4% and especially less than about 2%.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
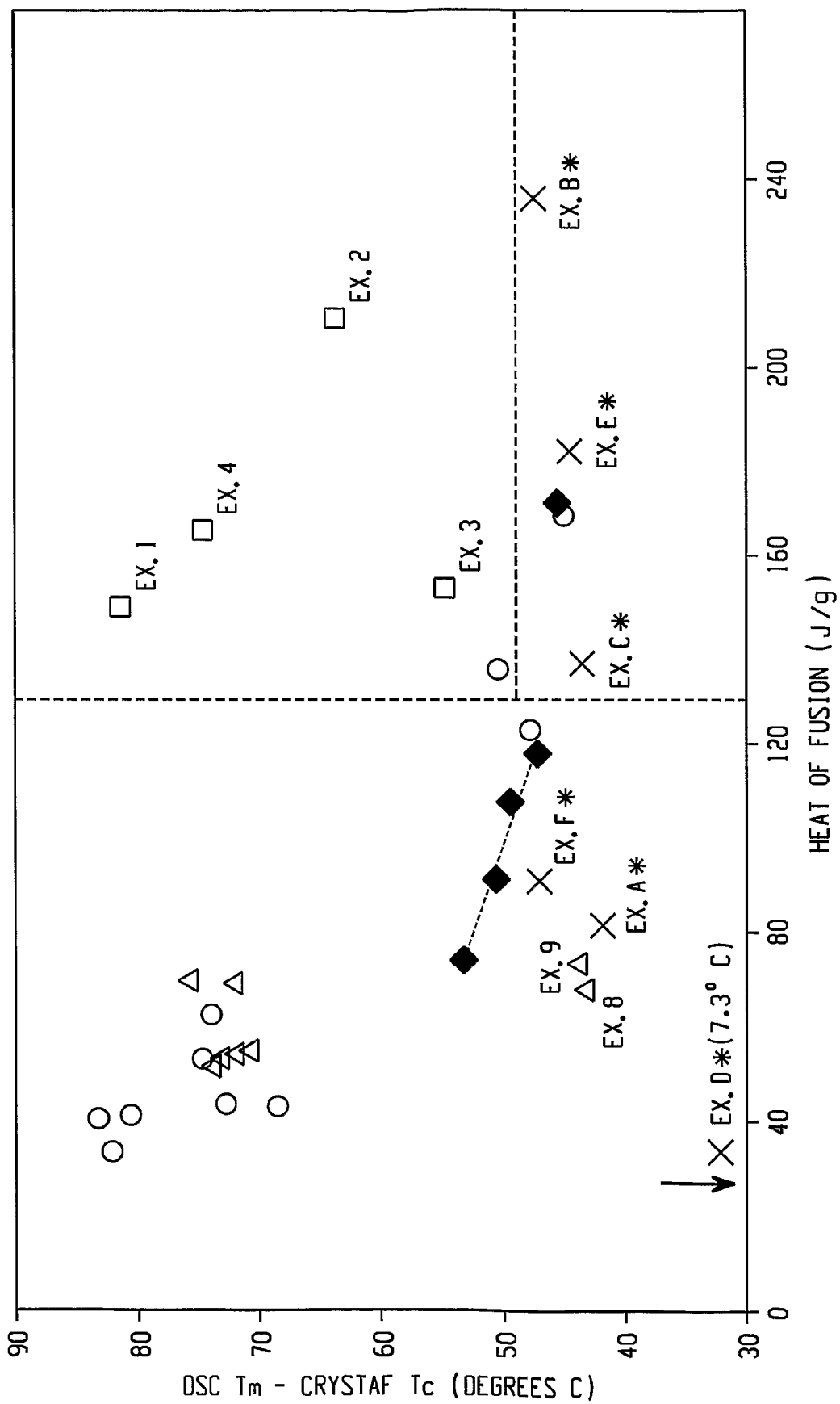
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 1501 - 1629(d); \text{ and even more preferably}$$

$$Re \geq 1511 - 1629(d).$$

Figure 3:
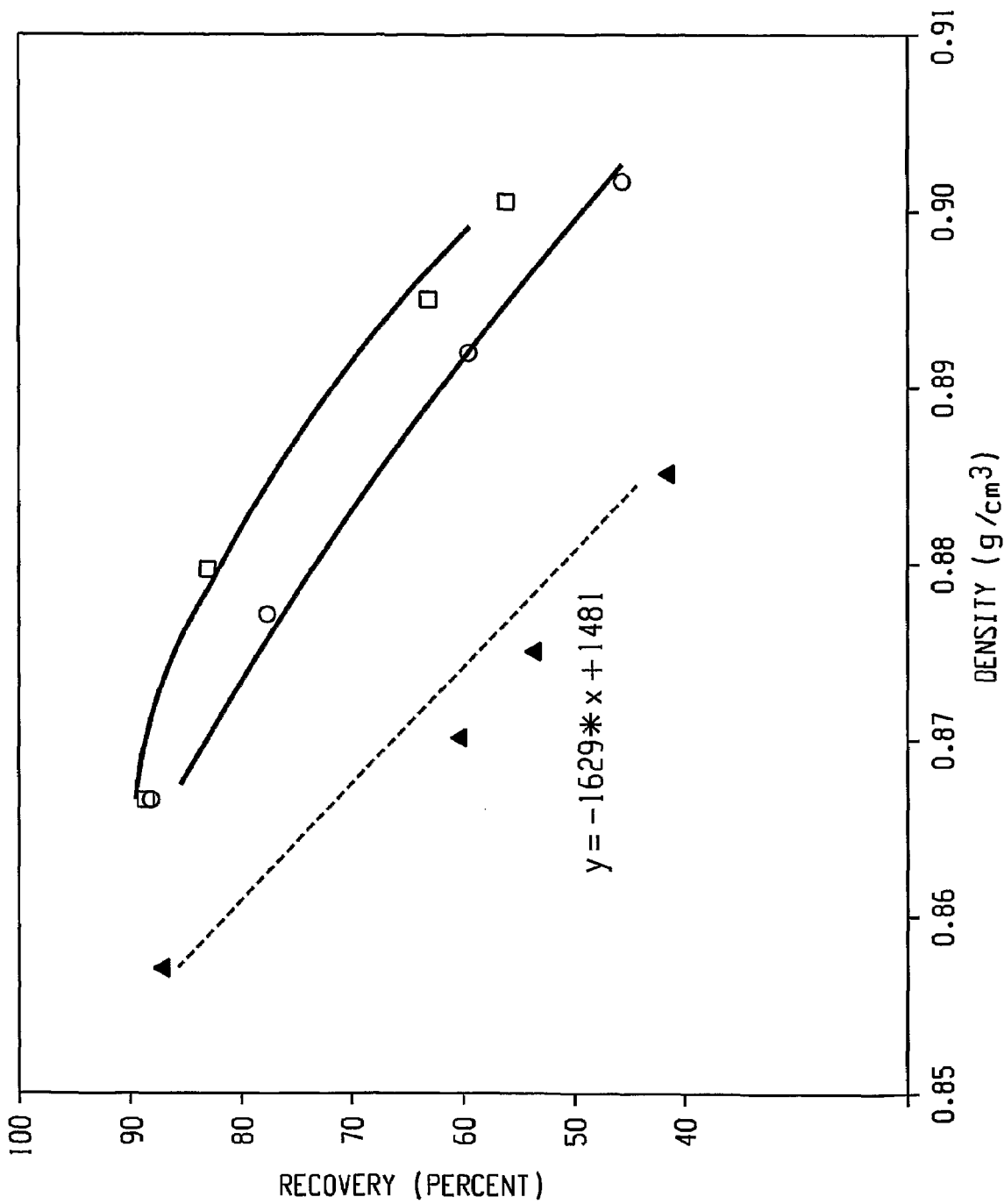
FIG. 3 shows the effect of density on elastic recovery for unoriented films comprising inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength ≧11 MPa, more preferably a tensile strength ≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
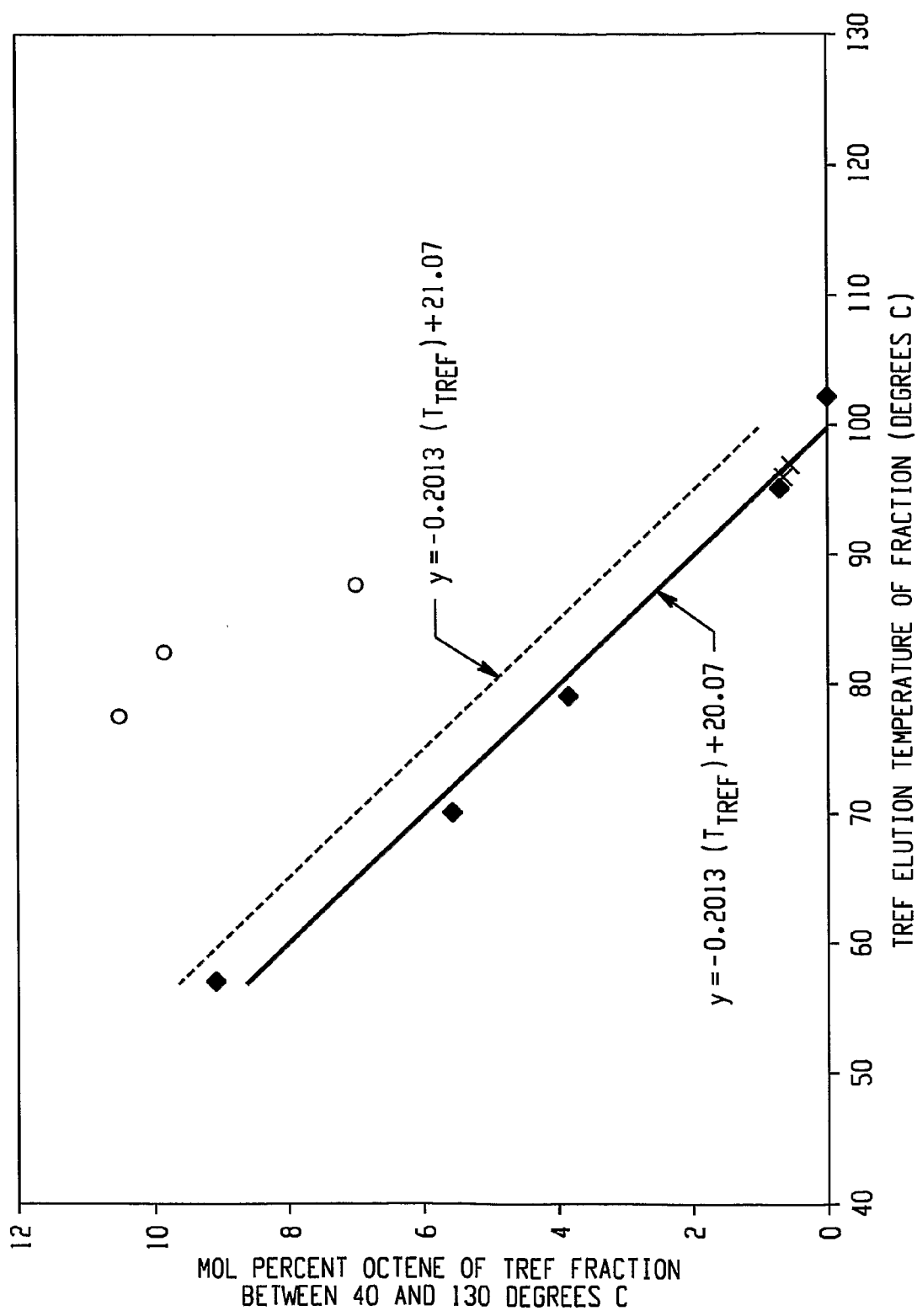
FIG. 4 is a plot of octene content of TREF fractionated ethylene/1-octene copolymer fractions versus TREF elution temperature of the fraction for the polymer of Example 5 (represented by the circles) and Comparative Examples E* and F* (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive intelpolymer and is believed to be due to the presence of differentiated blocks within the polymer chains, having both crystalline and amorphous nature.

Figure 5:
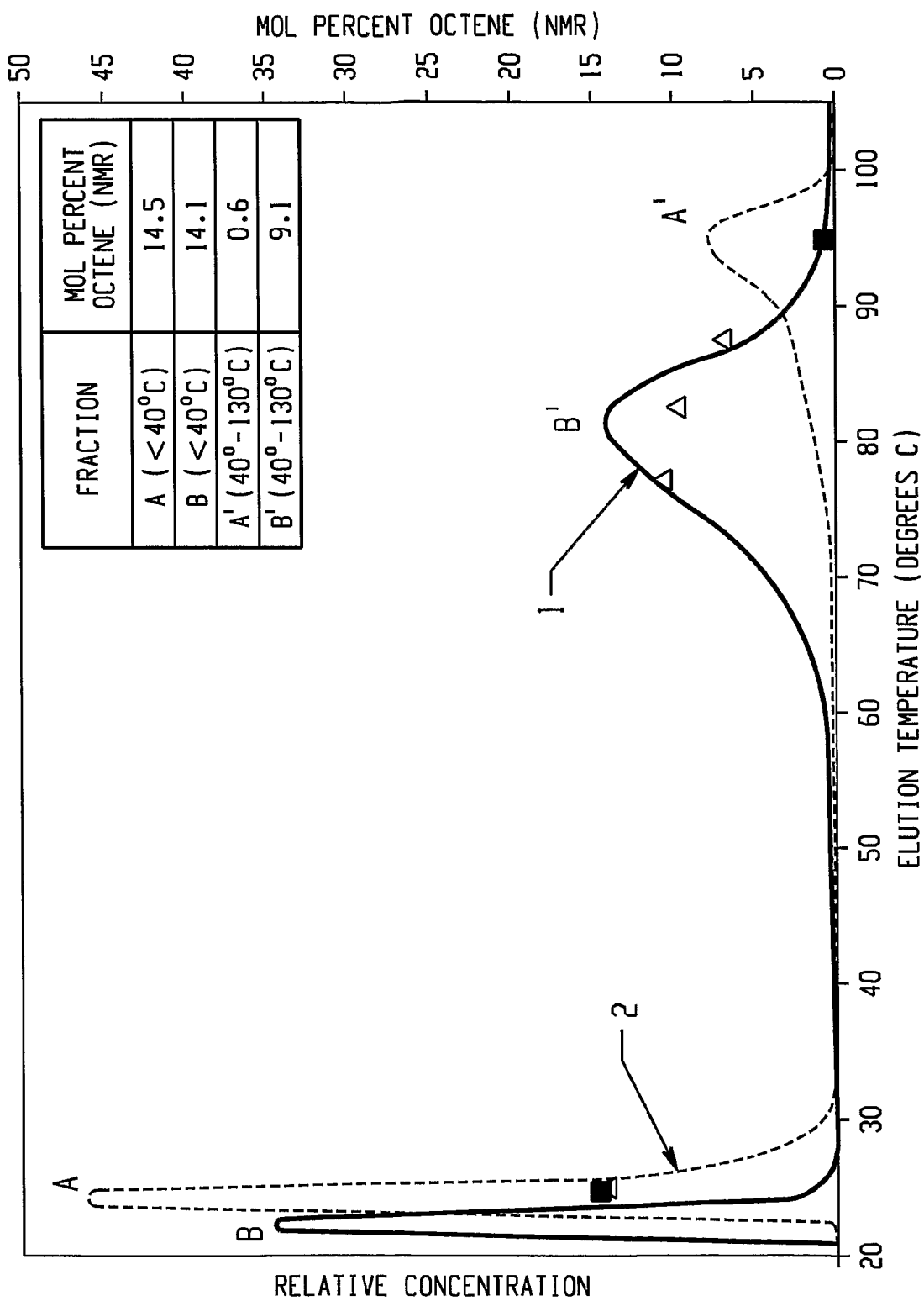
FIG. 5 is a plot of octene content of TREF fractionated ethylene/1-octene copolymer fractions versus TREF elution temperature of the fraction for the polymer of Example 5 (curve 1) and for Comparative Example F* (curve 2). The squares represent Example F*; and the triangles represent Example 5.

FIG. 5 graphically displays the TREF curve and comonomer contents of polymer fractions for Example 5 and Comparative Example F* to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013)T+21.07, where T is the numerical value of the peak ATREF elution temperature of the TREF fraction being compared, measured in °C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in °C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$T_m \geq (-5.5926) \text{ (mol percent comonomer in the fraction)}+135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in Celsius})-136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(\text{ATREF elution temperature in Celsius})+22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI=\Sigma(w_i BI_i)$$

where $BI_i$ is the block index for the ith fraction of the inventive ethylene/α-olefin interpolymer obtained in preparative TREF, and wi is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln P = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
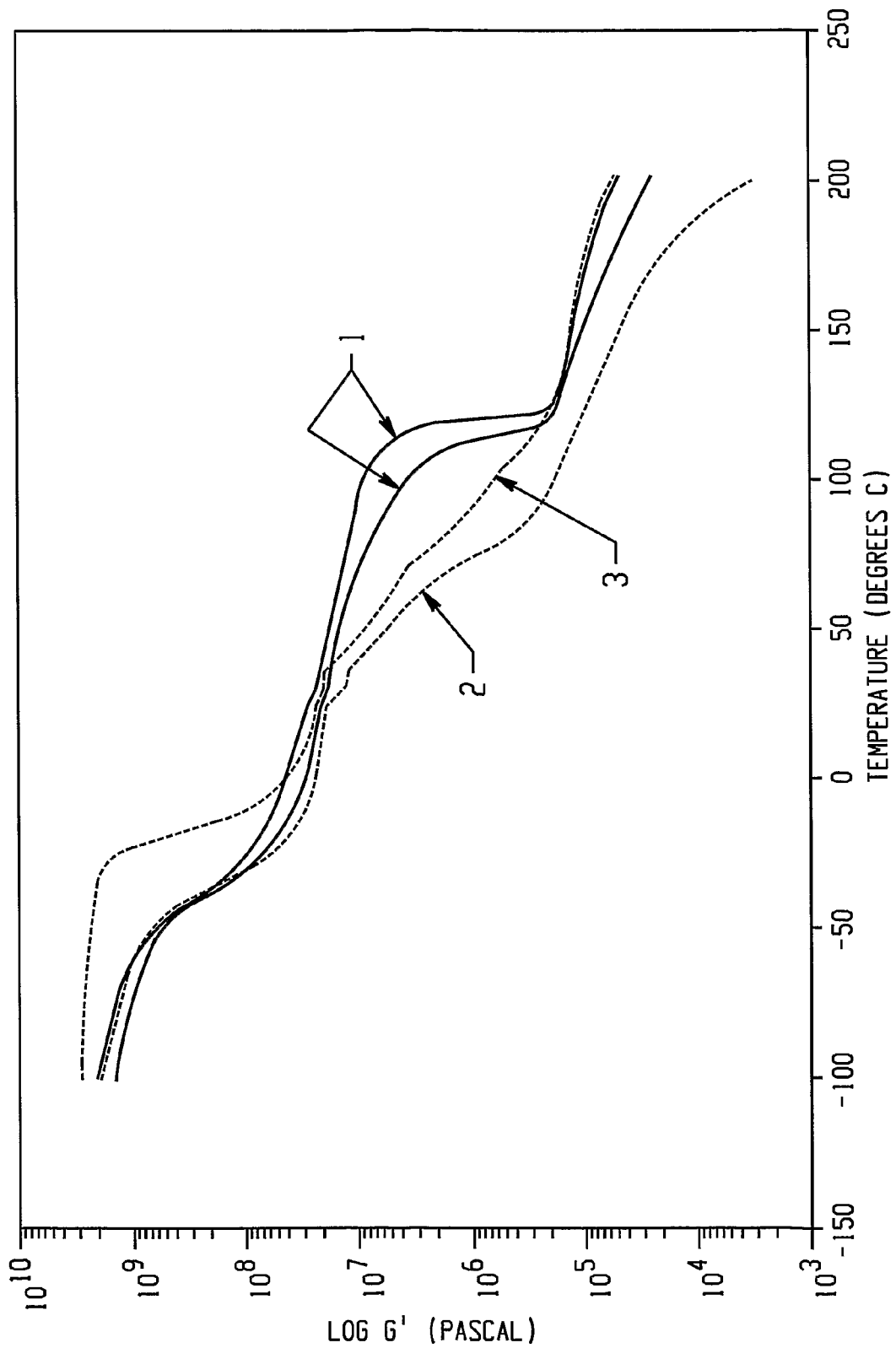
FIG. 6 is a graph of the log of storage modulus as a function of temperature for comparative ethylene/1-octene copolymer (curve 2) and ethylene/propylene copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
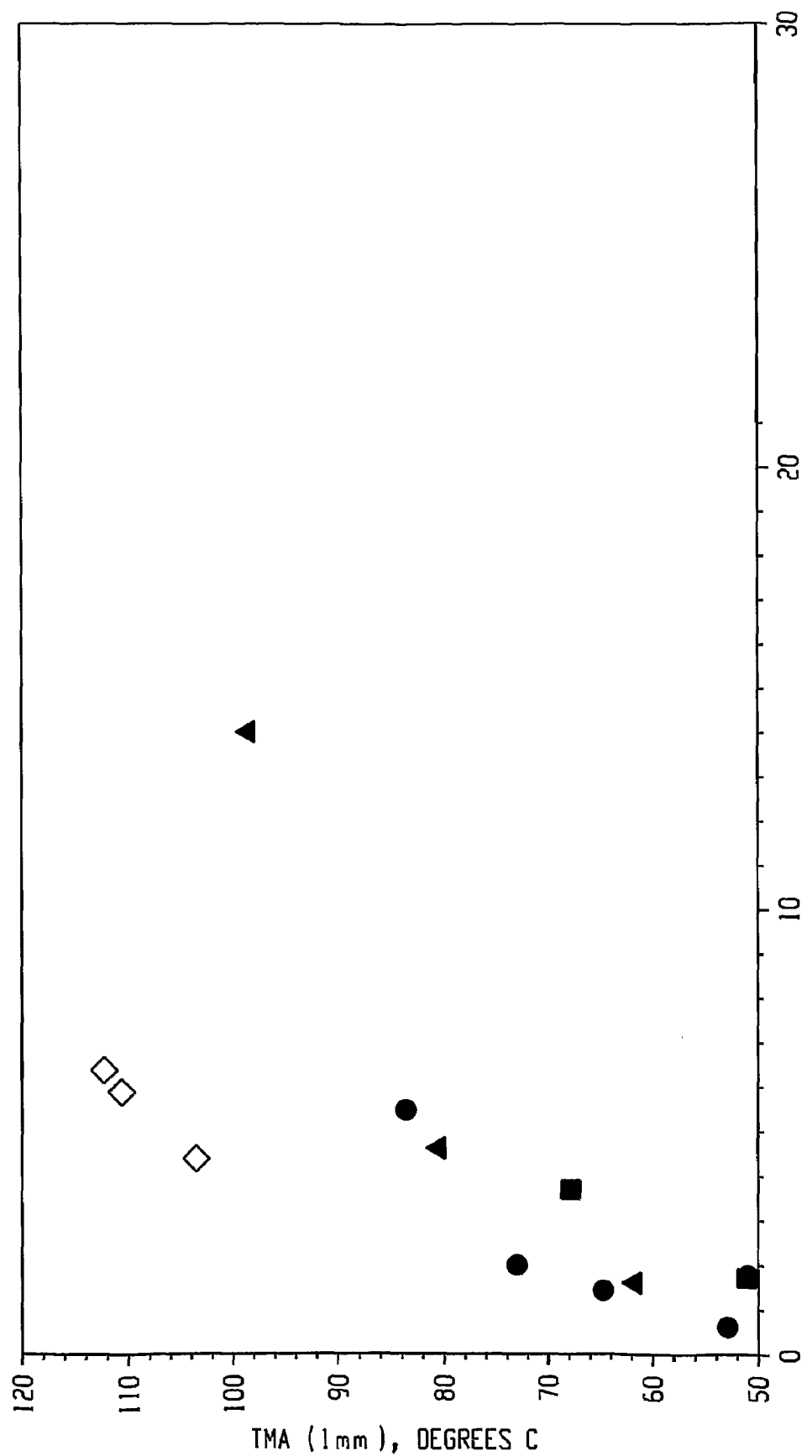
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/ α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/5662938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

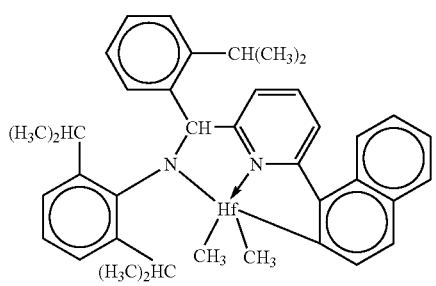

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

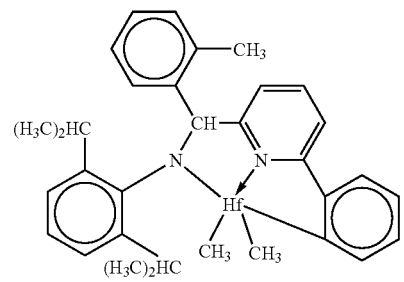

Catalyst (A3) is bis[N,N'''-(2,4,6-tri(methylphenyl)amido)ethylenediamine]hafnium dibenzyl.

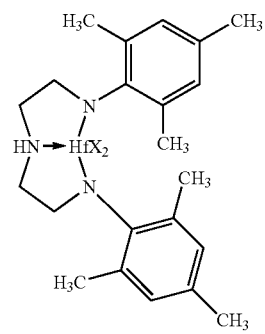

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

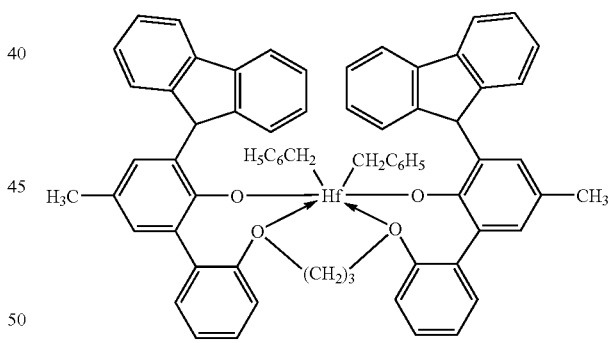

Catalyst (B1) is 1,2-bis-(3,5-di-t-butylphenylene)(1-(N-(1-methylethyl)immino)methyl)(2-oxoyl)zirconium dibenzyl

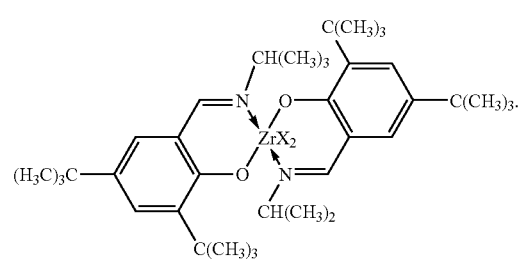

X = CH₂C₆H₅

Catalyst (B2) is 1,2-bis-(3 ,5-di-t-butylphenylene)(1-(N-(2-methylcyclohexyl)immino)methyl)(2-oxoyl)zirconium dibenzyl

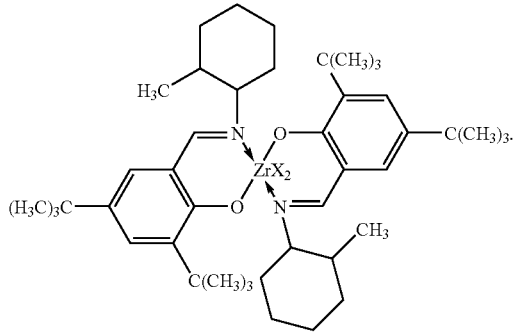

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

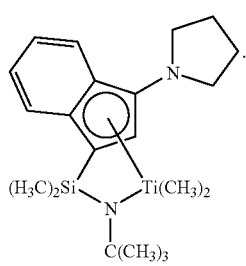

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

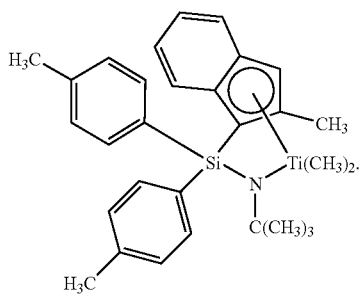

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

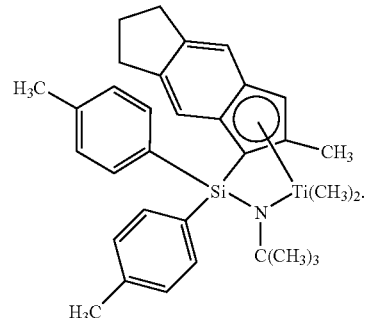

Catalyst (D1) is bis(dimethyldisiloxane)(indene-1-yl)zirconium dichloride available from Sigma-Aldrich:

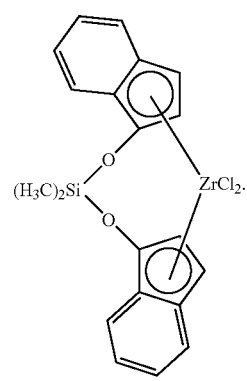

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic- dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The amount of the ethylene/α-olefin interpolymer in the polymer blend compositions disclosed herein can be from about 5 to about 99.5 wt %, from about 9% to about 99.5%, from about 10 to about 90 wt %, from about 20 to about 80 wt %, from about 30 to about 70 wt %, from about 10 to about 50 wt %, from about 50 to about 90 wt %, from about 60 to about 90 wt %, or from about 70 to about 90 wt % of the total weight of the polymer blend.

Second Polymers

As discussed above, the polymer blends provided herein comprise a second polymer component. This second polymer component is different than the ethylene/α-olefin interpolymer as the first polymer component. The second polymer can be a different ethylene/α-olefin interpolymer, a polyolefin, a polar polymer, an elastomer, and so on. When a second ethylene/α-olefin interpolymer is used, the two ethylene/α-olefin interpolymers in the blend have a different melt index, comonomer type, comonomer content, and/or overall density. The amount of the second ethylene/α-olefin interpolymer in the polymer blend disclosed herein can be from about 5 to about 99.5 wt %, from about 9% to about 99.5%, from about 10 to about 90 wt %, from about 20 to about 80 wt %, from about 30 to about 70 wt %, from about 10 to about 50 wt %, from about 50 to about 90 wt %, from about 60 to about 90 wt %, or from about 70 to about 90 wt % of the total weight of the polymer blend.

Bimodal physical or in-the-reactor blends of two ethylene/α-olefin interpolymers offer improved combinations of properties (such as compression set) and processability than a single distribution ethylene/α-olefin interpolymers of the same melt index.

Polyolefins

The polymer blends can comprise at least an polyolefin which may improve or modify the properties of the ethylene/α-olefin interpolymer. The polyolefin is a polymer derived from one or more olefins. An olefin (i.e., alkene) is a hydrocarbon contains at least one carbon-carbon double bond. Some non-limiting examples of olefins include linear or branched, cyclic or acyclic, alkenes having from 2 to about 20 carbon atoms. In some embodiments, the alkene has between 2 and about 10 carbon atoms. In other embodiments, the alkene contains at least two carbon-carbon double bonds, such as butadiene and 1,5-hexadiene. In further embodiments, at least one of the hydrogen atoms of the alkene is substituted with an alkyl or aryl. In particular embodiments, the alkene is ethylene, propylene, 1-butene, 1-hexene, 1-octene, 1-decene, 4-methyl-1-pentene, norbornene, 1-decene, butadiene, 1,5-hexadiene, styrene or a combination thereof.

Any polyolefin known to a person of ordinary skill in the art may be used to prepare the polymer blend disclosed herein. Non-limiting examples of polyolefins include polyethylenes (e.g., ultralow, low, linear low, medium, high and ultrahigh density polyethylene); polypropylenes (e.g., low and high density polypropylene); polybutylenes (e.g., polybutene-1); polypentene-1; polyhexene-1; polyoctene-1; polydecene-1; poly-3-methylbutene-1; poly-4-methylpentene-1; polyisoprene; polybutadiene; poly-1,5-hexadiene; interpolymers derived from olefins; interpolymers derived from olefins and other polymers such as polyvinyl chloride, polystyrene, polyurethane, and the like; and mixtures thereof. In some embodiments, the polyolefin is a homopolymer such as polyethylene, polypropylene, polybutylene, polypentene-1, poly-3-methylbutene-1, poly-4-methylpentene-1, polyisoprene, polybutadiene, poly-1,5-hexadiene, polyhexene-1, polyoctene-1 and polydecene-1. In other embodiments, the polyolefin is polypropylene or high density polyethylene (HDPE).

In some embodiments, the polyolefin is selected from LDPE, LLDPE, HDPE, EVA, EAA, EMA, ionomers thereof, metallocene LLDPE, impact grade propylene polymers, random grade propylene polymers, polypropylene and a compbination thereof.

The amount of the polyolefin in the polymer blend can be from about 5 to about 95 wt %, from about 10 to about 90 wt %, from about 20 to about 80 wt %, from about 30 to about 70 wt %, from about 10 to about 50 wt %, from about 50 to about 80 wt %, from about 60 to about 90 wt %, or from about 10 to about 30 wt % of the total weight of the polymer blend.

Elastomers

In certain aspects, the polymer blends provided herein comprise at least one thermoplastic vulcanizates (TPVs), styrenic block copolymers (such as SBS, SEBS, SEEPS, etc.), neoprene, ENGAGE®, AFFINITY®, Flexomer™, VERSIFY®, VISTAMAXX™, Exact™, Exceed™, functionalized elastomers (MAHg, silane modified, azide modified) polybutadiene rubber, butyl rubber or a combination thereof.

The elastomer may present in an amount ranging from about 1% to about 95%, about 5 % to about 91%, about 10% to about 80% or about 20% to about 50% of the total weight of the composition.

Thermoplastic elastomers are rubber-like materials that, unlike conventional vulcanized rubbers, can be processed and recycled like thermoplastic materials. When the thermoplastic elastomer contains a vulcanized rubber, it may also be referred to as a thermoplastic vulcanizate (TPV). TPVs are thermoplastic elastomers with a chemically cross-linked rubbery phase, produced by dynamic vulcanization. One measure of this rubbery behavior is that the material will retract to less than 1.5 times its original length within one minute, after being stretched at room temperature to twice its original length and held for one minute before release (ASTM D1566). Another measure is found in ASTM D412, for the determination of tensile set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of compression set.

Thermoplastic vulcanizates containing butyl or halogenated butyl rubber as the rubber phase and a thermoplastic polyolefin as the plastic or resin phase are known in the art. In one aspect, suitable thermoplastic vulcanizates (TPV) are made with polyurethane and chlorosulfonated polyethylene or a mixture of chlorosulfonated polyethylene and chlorinated polyethylene by dynamic vulcanization method wherein the vulcanizate contains about 30 to 70% polyurethane and about 70 to 30% chlorosulfonated polyethylene or a mixture of chlorosulfonated polyethylene and chlorinated polyethylene wherein the ratio of chlorosulfonated polyethylene to chlorinated polyethylene is about 3:1 to 1:3. Examples of thermoplastic vulcanizates include ethylene-propylene monomer rubber and ethylene-propylene-diene monomer rubber thermoset materials distributed in a crystalline polypropylene matrix.

One example of a commercial TPV is Satoprene® thermoplastic rubber which is manufactured by Advanced Elastomer Systems and is a mixture of crosslinked EPDM particles in a crystalline polypropylene matrix. Another example is VYRAM, consisting of a mixture of polypropylene and natural rubber, marketed by Advanced Elastomer Systems. Other suitable elastomers include KRATON, a brand of styrene block copolymer (SBC) marketed by Shell, and DYNAFLEX G 6725 (brand), a thermoplastic elastomer marketed by GLS Corporation and which is made with KRATON (brand) polymer.

Styrenic Block Coplymers

In some embodiments, the polymer compositions provided herein comprise at least one block copolymer. Block coplymers include block coplymers that comprise at least one styrenic block copolymer. The amount of a styrenic block copolymer in the polymer blend can be from about 0.5 to about 99 wt %, from about 1 to about 95 wt %, from about 10 to about 90 wt %, from about 20 to about 80 wt %, from about 30 to about 70 wt %, from about 5 to about 50 wt %, from about 50 to about 95 wt %, from about 10 to about 50 wt %, from about 10 to about 30 wt %, or from about 50 to about 90 wt % of the total weight of the polymer blend. In some embodiments, the amount of the styrenic block copolymer in the polymer blend can be from about 1 to about 25 wt %, from about 5 to about 15 wt %, from about 7.5 to about 12.5 wt %, or about 10 wt % of the total weight of the polymer blend.

Generally speaking, styrenic block copolymers include at least two monoalkenyl arene blocks, preferably two polystyrene blocks, separated by a block of a saturated conjugated diene, preferably a saturated polybutadiene block. The preferred styrenic block copolymers have a linear structure, although branched or radial polymers or functionalized block copolymers make useful compounds. The total number average molecular weight of the styrenic block copolymer is preferably from 30,000 to about 250,000 if the copolymer has a linear structure. Such block copolymers may have an average polystyrene content from 10% by weight to 40% by weight.

Suitable unsaturated block copolymers include, but are not limited to, those represented by the following formulas:

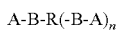
$$A-B-R(-B-A)_n \quad \text{Formula I}$$

or

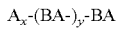
$$A_x-(BA-)_y-BA \quad \text{Formula II}$$

wherein each A is a polymer block comprising a vinyl aromatic monomer, preferably styrene, and each B is a polymer block comprising a conjugated diene, preferably isoprene or butadiene, and optionally a vinyl aromatic monomer, preferably styrene; R is the remnant of a multifunctional coupling agent (if R is present, the block copolymer can be a star or branched block copolymer); n is an integer from 1 to 5; x is zero or 1; and y is a real number from zero to 4.

Methods for the preparation of such block copolymers are known in the art. See, e.g., U.S. Pat. No. 5,418,290. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer may be ignored for an adequate description of the block copolymers.

Suitable block copolymers having unsaturated rubber monomer units include, but are not limited to, styrene-butadiene (SB), styrene-ethylene/butadiene (SEB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and α-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer. In some embodiments, the block copolymers are derived from (i) a $C_{3-20}$ olefin substituted with an alkyl or aryl group (e.g., 4-methyl-1-pentene and styrene) and (ii) a diene (e.g. butadiene, 1,5-hexadiene, 1,7-octadiene and 1,9-decadiene). A non-limiting example of such olefin copolymer includes styrene-butadiene-styrene (SBS) block copolymer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80 percent of the aliphatic double bonds while hydrogenating no more than 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is generally between 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of 5,000 to 125,000, preferably from 7,000 to 60,000 while the rubber monomer block segments will have average molecular weights in the range of 10,000 to 300,000, preferably from 30,000 to 150,000. The total average molecular weight of the block copolymer is typically in the range of 25,000 to 250,000, preferably from 35,000 to 200,000.

Further, the various block copolymers suitable for use in embodiments of the invention may be modified by graft incorporation of minor amounts of functional groups, such as, for example, maleic anhydride by any of the methods well known in the art.

Suitable block copolymers include, but are not limited to, those commercially available, such as, KRATON™ supplied by KRATON Polymers LLC in Houston, Tex., and VECTOR™ supplied by Dexco Polymers, L.P. in Houston, Tex.

Polar Polymers

In some embodiments, the polymer compositions provided herein comprise at least one polar polymer. A polar polymer is intended to denote thermoplastic, elastomeric and heat-curable polymers resulting from polymerization by polyaddition or polycondensation, which have a permanent dipole moment or, in other words, which contain dipolar groups in their molecule. By way of examples of such polar polymers there may be mentioned halogenated polymers such as vinyl chloride, vinylidene chloride and vinyl bromide polymers (homo- and copolymers), polymers containing nitrile functional groups, such as polyacrylonitrile and acrylonitrile/styrene copolymers or acrylonitrile/butadiene/styrene (ABS) copolymers, cellulose-based polymers, polyketones, both aliphatic and aromatic polyesters such as polymethyl or poly-ethyl acrylates and methacrylates and polyethylene terephthalate, vinyl alcohol/ethylene copolymers (that is o say vinyl acetate/ethylene copolymers in which at least 90% of the acetate groups have been converted into hydroxyl groups by hydrolysis or alcoholysis), aromatic polycarbonates, polyamides or nylons, and polyurethanes which, furthermore, are all well-known polymers. In some embodiments, polar polymers are nylon, polyamide, ethylene vinyl acetate, polyvinyl chloride, acrylonitrile/butadiene/styrene (ABS) copolymers, aromatic polycarbonates, ethylene/carboxylic acid copolymers or acrylics. The polar polymer may be present in a range from about 0.25% to about 90%, 1% to about 80%, 10% to about 50% or 10% to about 40% by total weight of the blend.

In certain embodiments, the polar polymer in the polymer blend compositions is an olefin/carboxylic acid interpolymer. Suitable carboxylic acid monomers include ethylenically unsaturated carboxylic acid monomers that have three to eight carbon atoms per molecule, including anhydrides, alkyl esters, half esters, etc. Examples of ethylenically unsaturated carboxylic acids include, but are not limited to, acrylic acid, methacrylic acid, maleic acid and anhydride, itaconic acid, fumaric acid, crotonic acid, citraconic acid and anhydride, methyl hydrogen maleate, ethyl hydrogen maleate, etc. In addition, other ethylenically unsaturated monomers which are not entirely hydrocarbon may also be used to make the interpolymers. Examples of such monomers include, but are not limited to, esters of ethylenically unsaturated carboxylic acid, such as ethyl acrylate, methyl methacrylate, ethyl methacrylate, methyl acrylate, isobutyl acrylate, and methyl fumarate. They may also include unsaturated esters of non-polymerizable carboxylic acid, such as vinyl acetate, vinyl propionate, vinyl benzoate, and vinyl halides, such as vinyl and vinylidene chloride, vinyl esters, ethylenically unsaturated amides and nitriles, such as acrylamide, acrylonitrile, methacrylonitrile, and fumaronitrile.

The olefin monomers should be present in the interpolymer in an amount from about 60 percent to about 90 percent by weight. The ethylenically unsaturated carboxylic acid monomers should be present in the interpolymer from about 5 percent to about 25 percent by weight. Another type of ethylenically unsaturated carboxylic acid monomers may be present from 0 to about 20 wt. percent in the interpolymer. The aforementioned interpolymers may be prepared by the methods and procedures as described in U.S. Pat. Nos. 3,436,363; 3,520,861; 4,599,392; and 4,988,781. The disclosures of these patents are incorporated by reference herein in their entirety. One skilled in the art recognizes that the characteristics of such polymers may be tailored by adjusting various parameters, such are reaction time, temperature and pressure, of a polymerization method or procedure. One parameter that may be adjusted to control the melt index of a polymer is the hydrogen concentration. Higher hydrogen concentrations tend to produce polymers with higher melt indices, although the relationship is not necessarily linear.

Suitable interpolymers can also be made from preformed, non-acid polymers by subsequent chemical reactions carried out thereon. For example, the carboxylic acid group may be supplied by grafting a monomer such as acrylic acid or maleic acid onto a polymer substrate such as ethylene. Additionally, interpolymers containing carboxylic anhydride, ester, amide, acylhalide, and nitrile groups can be hydrolyzed to carboxylic acid groups.

Furthermore, the interpolymers may be further modified by the method described in U.S. Pat. No. 5,384,373, which is incorporated by reference herein in its entirety. The resulting modified interpolymer may also be used in embodiments of the invention. α-methyl styrene, toluene, t-butyl styrene, etc.

Suitable ethylenically unsaturated carboxylic acid monomers preferably have three to eight carbon atoms per molecule, including anhydrides, alkyl esters, half esters, etc. Examples of ethylenically unsaturated carboxylic acids include, but are not limited to, acrylic acid, methacrylic acid, maleic acid and anhydride, itaconic acid, fumaric acid, crotonic acid, citraconic acid and anhydride, methyl hydrogen maleate, ethyl hydrogen maleate, etc. In addition, other ethylenically unsaturated monomers which are not entirely hydrocarbon may also be used to make the interpolymers. Examples of such monomers include, but are not limited to, esters of ethylenically unsaturated carboxylic acid, such as ethyl acrylate, methyl methacrylate, ethyl methacrylate, methyl acrylate, isobutyl acrylate, and methyl fumarate. They may also include unsaturated esters of non-polymerizable carboxylic acid, such as vinyl acetate, vinyl propionate, vinyl benzoate, and vinyl halides, such as vinyl and vinylidene chloride, vinyl esters, ethylenically unsaturated amides and nitriles, such as acrylamide, acrylonitrile, methacrylonitrile, and fumaronitrile.

Certain exemplary olefin/carboxylic acid interpolymers include ethylene-acrylic acid copolymers, ethylene-methacrylic acid copolymers, ethylene-itaconic acid copolymers, ethylene-methyl hydrogen maleate copolymers, ethylene-maleic acid copolymers, ethylene-acrylic acid copolymers, ethylene-methacrylate copolymers, ethylene-methacrylic acid-ethacrylate copolymers, ethylene-itaconic acid-methacrylate copolymers, ethylene-itaconic acid-methacrylate copolymers, ethylene-methyl hydrogen maleate-ethyl acrylate copolymers, ethylene-methacrylic acid-vinyl acetate copolymers, ethylene-acrylic acid copolymers, ethylene-acrylic acid-vinyl alcohol copolymers, ethylene-acrylic acid-carbon monoxide copolymers, ethylene-propylene-acrylic acid copolymers, ethylene-methacrylic acid-acrylonitrile copolymers, ethylene-fumaric acid-vinyl methyl ether copolymers, ethylene-vinyl chloride-acrylic acid copolymers, ethylene-vinylidene chloride-acrylic acid copolymers, ethylene-vinylidene chloride-acrylic acid copolymers, ethylene-vinyl fluoride-methacrylic acid copolymers and ethylene-chlorotrifluoroethlyene-methacrylic acid copolymers.

The ionomers of olefin/carboxylic acid interpolymers are ionically crosslinked to thermoplastics generally obtained by neutralizing a copolymer containing pendant acid groups e.g., carboxylic acid groups, with an ionizable metal compound, e.g., a compound of the monovalent, divalent and/or trivalent metals of Group I, II, IV-A and VIIIB of the periodic table of the elements.

Preferred groups of ionomer resins are derived from a copolymer of at least one alpha-olefin and at least one ethylenically unsaturated carboxylic acid and/or anhydride. Suitable alpha-olefins include ethylene, propylene, 1-butene, 1-pentene, 1-hexene, 1-heptene, 3-methylbutene, isobutene, butadiene, isoprene, α-methyl styrene, toluene, t-butyl styrene and styrene and the like. Suitable carboxylic acids and anhydrides include acrylic acid, methacrylic acid, ethacrylic acid, maleic acid, fumaric acid, maleic anhydride, and the like. The foregoing copolymers generally contain from about 0.2 to about 20 mole percent, and preferably from about 0.5 to about 10 mole percent, carboxylic acid groups.

Preferred ionomers are obtained by reacting the foregoing copolymers with a sufficient amount of metal ions as to neutralize at least some portion of the acid groups, preferably at least about 5 percent by weight and preferably from about 20 to about 100 percent by weight, of the acid groups present. Suitable metal ions include $Na^+$, $K^+$, $Li^+$, $Cs^+$, $Rb^+$, $Hg^+$, $Cu^+$, $Be^{+2}$, $Mg^{+2}$, $Ca^{+2}$, $Sr^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$, $Zn^{+2}$, $Al^{+3}$ and $Y^{+3}$. Preferred metals suitable for neutralizing the copolymers used herein are the alkali metals, particularly, cations such as sodium, lithium and potassium and alkaline earth metals, in particular, cations such as calcium, magnesium and zinc. One or more ionomers may be used in the present invention. Preferred ionomers include Surlyn™ 1702, which is a zinc salt of an ethylene and methacrylic acid copolymer and Surlyn™ 8660, which is a sodium salt of an ethylene and methacrylic acid copolymer. Both Surlyn™ 1702 and Surlyn™ 8660 may be obtained from E.I. Dupont de Nemours & Company, Wilmington, Del.

The ethylene/carboxylic acid interpolymer or ionomer may be found in the gasket composition in the range from about 2% to about 15% by weight of the three component composition. Preferably, the ethylene/carboxylic acid interpolymer or ionomer may be found in the gasket composition in the range from about 4% to about 12%, about 2% to about 12% by weight, or from about 2% to about 10%. Most preferably, the ethylene/carboxylic acid interpolymer or ionomer may be found in the gasket composition in an amount in the range from about 4% to about 10%. The melt index of the interpolymer of ethylene and acrylic acid is about 0.15 to about 400 g/10 min. Preferably, the melt index is about 1 to about 100 g/10 min., and most preferably, from about 1 to about 30 g/10 min.

In another embodiment of the invention, a gasket composition may comprise ethylene/alpha-olefin polymers used in the present invention and a interpolymer of ethylene and acrylic acid. The acrylic acid can be found in the interpolymer in the range from about 3% to about 50% by weight of the interpolymer. Preferably, the acrylic acid can be found in the range from about 5% to about 18%, and most preferably, from about 6.5% to about 15%.

An example of a suitable interpolymer of ethylene and acrylic acid is Primacor™ 5980 (having about 20% acrylic acid and a melt index ($I_2$) of about 300 grams/10 minutes), which may be purchased from The Dow Chemical Company. Examples of other suitable interpolymers of ethylene and acrylic acid may be found in U.S. Pat. Nos. 4,500,664, 4,988,781 and 4,599,392, the disclosures of which are hereby incorporated by reference.

Additives

Optionally, the polymer blends disclosed herein can comprise at least one additive for the purposes of improving and/or controlling the processibility, appearance, physical, chemical, and/or mechanical properties of the polymer blends. In some embodiments, the polymer blends do not comprise an additive. Any plastics additive known to a person of ordinary skill in the art may be used in the polymer blends disclosed herein. Non-limiting examples of suitable additives include slip agents, anti-blocking agents, plasticizers, antioxidants, UV stabilizers, colorants or pigments, fillers, lubricants, antifogging agents, flow aids, coupling agents, crosslinking agents, nucleating agents, surfactants, solvents, flame retardants, antistatic agents, oil or extender, odor absorber and combinations thereof. The total amount of the additives can range from about greater than 0 to about 80%, from about 0.001% to about 70%, from about 0.01% to about 60%, from about 0.1% to about 50%, from about 1% to about 40%, or from about 10% to about 50% of the total weight of the polymer blend. Some polymer additives have been described in Zweifel Hans et al., "*Plastics Additives Handbook,*" Hanser Gardner Publications, Cincinnati, Ohio, 5th edition (2001), which is incorporated herein by reference in its entirety.

Slip Agents

In some embodiments, the polymer blends disclosed herein comprise a slip agent. In other embodiments, the polymer blends disclosed herein do not comprise a slip agent. Slip is the sliding of film surfaces over each other or over some other substrates. The slip performance of films can be measured by ASTM D 1894, *Static and Kinetic Coefficients of Friction of Plastic Film and Sheeting,* which is incorporated herein by reference. In general, the slip agent can convey slip properties by modifying the surface properties of films; and reducing the friction between layers of the films and between the films and other surfaces with which they come into contact. In some embodiments, the slip agents include suitable abrasion resistance enhancing additives as would be known to the skilled artisan.

Any slip agent known to a person of ordinary skill in the art may be added to the polymer blends disclosed herein. In some embodiments, the slip agent is hydrocarbon having one or more functional groups selected from hydroxide, aryls and substituted aryls, halogens, alkoxys, carboxylates, esters, carbon unsaturation, acrylates, oxygen, nitrogen, carboxyl, sulfate and phosphate. In some embodiments, the slip agent is selected from esters, amides, alcohols and acids of aromatic and aliphatic hydrocarbon oils. In another embodiment, the slip agent is carnauba wax, microcrystalline wax or polyolefin waxes or any other conventional wax. Amounts of wax range from about 2 to about 15 weight % based on the total weight of the composition. Any conventional wax useful in thermoplastic films may be contemplated. In some embodiments, the slip agent is a fluoro-containing polymer. In some embodiments, the slip agent is an oxidized polyethylene.

In some embodiments, the slip agents are silicon based materials such as high molecular weight polydialkyl siloxanes such as polydimethyl siloxanes, silicone oil or gum additive; waxy materials that bloom to the surface such as erucamide, and some specialty materials that contain a combination of a hard tough plastic such as nylon with surface active agents. In some embodiments, the amount of polydialkylsiloxane is sufficient to reduce friction when the film may be formed or when it may be manipulated in packaging machinery.

In a particular embodiment, the slip agent for the polymer blends disclosed herein is an amide represented by Formula (I) below:

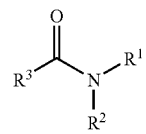

(I)

wherein each of $R^1$ and $R^2$ is independently H, alkyl, cycloalkyl, alkenyl, cycloalkenyl or aryl; and $R^3$ is alkyl or alkenyl, each having about 11 to about 39 carbon atoms, about 13 to about 37 carbon atoms, about 15 to about 35 carbon atoms, about 17 to about 33 carbon atoms or about 19 to about 33 carbon atoms. In some embodiments, $R^3$ is alkyl or alkenyl, each having at least 19 to about 39 carbon atoms. In other embodiments, $R^3$ is pentadecyl, heptadecyl, nonadecyl, heneicosanyl, tricosanyl, pentacosanyl, heptacosanyl, nonacosanyl, hentriacontanyl, tritriacontanyl, nonatriacontanyl or a combination thereof. In further embodiments, $R^3$ is pentadecenyl, heptadecenyl, nonadecenyl, heneicosanenyl, tricosanenyl, pentacosanenyl, heptacosanenyl, nonacosanenyl, hentriacontanenyl, tritriacontanenyl, nonatriacontanenyl or a combination thereof.

In a further embodiment, the slip agent for the polymer blends disclosed herein is an amide represented by Formula (II) below:

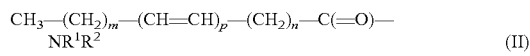

$$CH_3-(CH_2)_m-(CH=CH)_p-(CH_2)_n-C(=O)-NR^1R^2 \quad (II)$$

wherein each of m and n is independently an integer between about 1 and about 37; p is an integer between 0 and 3; each of $R^1$ and $R^2$ is independently H, alkyl, cycloalkyl, alkenyl, cycloalkenyl or aryl; and the sum of m, n and p is at least 8. In some embodiments, each of $R^1$ and $R^2$ of Formulae (I) and (II) is an alkyl group containing between 1 and about 40 carbon atoms or an alkenyl group containing between 2 and about 40 carbon atoms. In further embodiments, each of $R^1$ and $R^2$ of Formulae (I) and (II) is H. In certain embodiments, the sum of m, n and p is at least 18.

The amide of Formula (I) or (II) can be prepared by the reaction of an amine of formula H—$NR^1R^2$ where each of $R^1$ and $R^2$ is independently H, alkyl, cycloalkyl, alkenyl, cycloalkenyl or aryl with a carboxylic acid having a formula of $R^3$—$CO_2H$ or $CH_3$—$(CH_2)_m$—$(CH=CH)_p$—$(CH_2)_n$—$CO_2H$ where $R^3$ is alkyl or alkenyl, each having at least 19 to about 39 carbon atoms; each of m and n is independently an integer between about 1 and about 37; and p is 0 or 1. The amine of formula H—$NR^1R^2$ can be ammonia (i.e., each of $R^1$ and $R^2$ is H), a primary amine (i.e., $R^1$ is alkyl, cycloalkyl, alkenyl, cycloalkenyl or aryl and $R^2$ is H) or a secondary amine (i.e., each of $R^1$ and $R^2$ is independently alkyl, cycloalkyl, alkenyl, cycloalkenyl or aryl). Some non-limiting examples of primary amine include methylamine, ethylamine, octadecylamine, behenylamine, tetracosanylamine, hexacosanylamine, octacosanylamine, triacontylamine, dotriacontylamine, tetratriacontylamine, tetracontylamine, cyclohexylamine and combinations thereof. Some non-limiting examples of secondary amine include dimethylamine, diethylamine, dihexadecylamine, dioctadecylamine, dieicosylamine, didocosylamine, dicetylamine, distearylamine, diarachidylamine, dibehenylamine, dihydrogenated tallow amine, and combinations thereof. The primary amines and secondary amines can be prepared by methods known to a person of ordinary skill in the art or obtained from a commercial supplier such as Aldrich Chemicals, Milwaukee, Wis.; ICC Chemical Corporation, New York, N.Y.; Chemos GmbH, Regenstauf, Germany; ABCR GmbH & Co. KG, Karlsruhe, Germany; and Acros Organics, Geel, Belgium.

The primary amines or secondary amines may be prepared by reductive amination reaction. The reductive amination is the process by which ammonia or a primary amine is condensed with an aldehyde or a ketone to form the corresponding imine which is subsequently reduced to an amine. The subsequent reduction of imine to amine may be accomplished by reacting the imine with hydrogen and a suitable hydrogenation catalyst such as Raney Nickel and platinum oxide, aluminum-mercury amalgam, or a hydride such as lithium aluminum hydride, sodium cyanoborohydride, and sodium borohydride. The reductive amination is described in U.S. Pat. No. 3,187,047; and articles by Haskelberg, "Aminative Reduction of Ketones," J. Am. Chem. Soc., 70 (1948) 2811-2; Mastagli et al., "Study of the Aminolysis of Some Ketones and Aldehydes," Bull. soc. chim. France (1950) 1045-8; B. J. Hazzard, Practical Handbook of Organic Chemistry, Addison-Wesley Publishing Co., Inc., pp. 458-9 and 686 (1973); and Alexander et al., "A Low Pressure Reductive Alkylation Method for the Conversion of Ketones to Primary Amines," J. Am. Chem. Soc., 70, 1315-6 (1948). The above U.S. patent and articles are incorporated herein by reference.

Non-limiting examples of the carboxylic acid include straight-chain saturated fatty acids such as tetradecanoic acid, pentadecanoic acid, hexadecanoic acid, heptadecanoic acid, octadecanoic acid, nonadecanoic acid, eicosanoic acid, heneicosanic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentriacontanoic acid, dotriacontanoic acid, tetratriacontanoic acid, hexatriacontanoic acid, octatriacontanoic acid and tetracontanoic acid; branched-chain saturated fatty acids such as 16-methylheptadecanoic acid, 3-methyl-2-octylynonanoic acid, 2,3-dimethyloctadecanoic acid, 2-methyltetracosanoic acid, 11-methyltetracosanoic acid, 2-pentadecyl-heptadecanoic acid; unsaturated fatty acids such as trans-3-octadecenoic acid, trans-11-eicosenoic acid, 2-methyl-2-eicosenoic acid, 2-methyl-2-hexacosenoic acid, β-eleostearic acid, α-parinaric acid, 9-nonadecenoic acid, and 22-tricosenoic acid, oleic acid and erucic acid. The carboxylic acids can be prepared by methods known to a person of ordinary skill in the art or obtained from a commercial supplier such as Aldrich Chemicals, Milwaukee, Wis.; ICC Chemical Corporation, New York, N.Y.; Chemos GmbH, Regenstauf, Germany; ABCR GmbH & Co. KG, Karlsruhe, Germany; and Acros Organics, Geel, Belgium. Some known methods for the preparation of the carboxylic acids include the oxidation of the corresponding primary alcohols with an oxidation agent such as metal chromates, metal dichromates and potassium permanganate. The oxidation of alcohols to carboxylic acids is described in Carey et al., "Advance Organic Chemistry, Part B: Reactions and Synthesis," Plenum Press, New York, 2nd Edition, pages 481-491 (1983), which is incorporated herein by reference.

The amidation reaction can take place in a solvent that is not reactive toward the carboxylic acid. Non-limiting examples of suitable solvents include ethers (i.e., diethyl ether and tetrahydrofuran), ketones (such as acetone and methyl ethyl ketone), acetonitrile, dimethyl sulfoxide, dimethyl formamide and the like. The amidation reaction can be promoted by a base catalyst. Non-limiting examples of the base catalyst include inorganic bases such as sodium hydroxide, potassium hydroxide, sodium carbonate, potassium carbonate, sodium hydrogen carbonate, sodium acetate, ammonium acetate, and the like, metal alkoxides such as sodium methoxide, sodium ethoxide, and the like, amines such as triethylamine, diisopropylethylamine, and the like. In some embodiments, the catalyst is an amine or a metal alkoxide.

In some embodiments, the slip agent is a primary amide with a saturated aliphatic group having about 12 to about 40 carbon atoms or about 18 to about 40 carbon atoms (e.g., stearamide and behenamide). In other embodiments, the slip agent is a primary amide with an unsaturated aliphatic group containing at least one carbon-carbon double bond and between 18 and about 40 carbon atoms (e.g., erucamide and oleamide). In further embodiments, the slip agent is a primary amide having at least 20 carbon atoms. In some embodiments, the slip agents are secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof. In further embodiments, the slip agent is erucamide, oleamide, stearamide, behenamide, ethylene-bis-stearamide, ethylene-bis-oleamide, stearyl erucamide, behenyl erucamide, erucyl erucamide, oleyl palimitamide, stearyl stearamide, erucyl stearamide, ethylene bisamides such as N,N-ethylenebisstearamide, N,N-ethylenebisolamide and the like, 13-cis-docosenamide or a combination thereof. In a particular embodiment, the slip agent is erucamide. In further embodiments, the slip agent is commercially available having a trade name such as ATMER™ SA from Uniqema, Everberg, Belgium; ARMOSLIP® from Akzo Nobel Polymer Chemicals, Chicago, Ill.; KEMAMIDE® from Witco, Greenwich, Conn.; and CRODAMIDE® from Croda, Edison, N.J. Where used, the amount of the slip agent in the polymer blend can be from about greater than 0 to about 10 wt %, about greater than 0 to about 8 wt %, about greater than 0 to about 3 wt %, from about 0.0001 to about 2 wt %, from about 0.001 to about 1 wt %, from about 0.001 to about 0.5 wt % or from about 0.05 to about 0.25 wt % of the total weight of the polymer blend. Some slip agents have been described in Zweifel Hans et al., "*Plastics Additives Handbook*," Hanser Gardner Publications, Cincinnati, Ohio, 5th edition, Chapter 8, pages 601-608 (2001), which is incorporated herein by reference.

Anti-blocking Agents

Optionally, the polymer blends disclosed herein can comprise an anti-blocking agent. In some embodiments, the polymer blends disclosed herein do not comprise an anti-blocking agent. The anti-blocking agent can be used to prevent the undesirable adhesion between touching layers of articles made from the polymer blends, particularly under moderate pressure and heat during storage, manufacture or use. Any anti-blocking agent known to a person of ordinary skill in the art may be added to the polymer blends disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion.

Where used, the amount of the anti-blocking agent in the polymer blend can be from about greater than 0 to about 3 wt %, from about 0.0001 to about 2 wt %, from about 0.001 to about 1 wt %, or from about 0.001 to about 0.5 wt % of the total weight of the polymer blend. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

Plasticizers

Optionally, the polymer blends disclosed herein can comprise a plasticizer or plasticizing oil or an extender oil. In general, a plasticizer is a chemical that can increase the flexibility and lower the glass transition temperature of polymers. Any plasticizer known to a person of ordinary skill in the art may be added to the polymer blends disclosed herein. Non-limiting examples of plasticizers include abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof.

In further embodiments, the plasticizers include olefin oligomers, low molecular weight polyolefins such as liquid polybutene, phthalates, mineral oils such as naphthenic, paraffinic, or hydrogenated (white) oils (e.g. Kaydol oil), vegetable and animal oil and their derivatives, petroleum derived oils, and combinations thereof. In some embodiments, the plasticizers include polypropylene, polybutene, hydrogenated polyisoprene, hydrogenated polybutadiene, polypiperylene and copolymers of piperylene and isoprene, and the like having average molecular weights between about 350 and about 10,000. In other embodiments, the plasticizers include glyceryl esters of the usual fatty acids and polymerization products thereof.

In some embodiments, a suitable insoluble plasticizer may be selected from the group which includes dipropylene glycol dibenzoate, pentaerythritol tetrabenzoate; polyethylene glycol 400-di-2-ethylhexoate; 2-ethylhexyl diphenyl phsophate; butyl benzyl phthalate, dibutyl phthalate, dioctyl phthalate, various substituted citrates, and glycerates. Suitable dipropylene glycol dibenzoate and pentaerythritol tetrabenzoate may be purchased from Velsicol Chemical Company of Chicago, Ill. under the trade designations "Benzoflex 9-88 and S-552", respectively. Further, a suitable polyethylene glycol 400-di-2-ethylhexoate may be purchased from C.P. Hall Company of Chicago, Ill. under the trade designation "Tegmer 809". A suitable 2-ethylhexyl diphenyl phosphate, and a butyl benzyl phthalate may be purchased from Monsanto Industrial Chemical Company of St. Louis, Mo. under the trade designation "Santicizer 141 and 160", respectively. In some embodiments, AFFINITY® GA high flow polymers, such as AFFINITY® GA 1950 POP and AFFINITY® GA 1900 POP as extenders to improve processability without noticeably reducing key performance properties.

Some plasticizers have been described in George Wypych, "*Handbook of Plasticizers*," ChemTec Publishing, Toronto-Scarborough, Ontario (2004), which is incorporated herein by reference. Where used, the amount of the plasticizer in the polymer blend can be from greater than 0 to about 65 wt %, greater than 0 to about 50 wt %, greater than 0 to about 25 wt %, greater than 0 to about 15 wt %, from about 0.5 to about 10 wt %, or from about 1 to about 5 wt % of the total weight of the polymer blend.

Tackifiers

In some embodiments, the compositions disclosed herein can comprise a tackifier or tackifying resin or tackifier resin. The tackifier may modify the properties of the composition such as viscoelastic properties (e.g., tan delta), rheological properties (e.g., viscosity), tackiness (i.e., ability to stick), pressure sensitivity, and wetting property. In some embodiments, the tackifier is used to improve the tackiness of the composition. In other embodiments, the tackifier is used to reduce the viscosity of the composition. In further embodiments, the tackifier is used to render the composition a pressure-sensitive adhesive. In particular embodiments, the tackifier is used to wet out adherent surfaces and/or improve the adhesion to the adherent surfaces.

Any tackifier known to a person of ordinary skill in the art may be used in the adhesion composition disclosed herein. Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof. The amount of the tackifier in the composition can be from about 5 to about 70 wt %, from about 10 to about 65 wt %, or from about 15 to about 60 wt % of the total weight of the composition.

In other embodiments, the tackifiers include rosin-based tackifiers (e.g. AQUATAC® 9027, AQUATAC® 4188, SYLVALITE®, SYLVATAC® and SYLVAGUM® rosin esters from Arizona Chemical, Jacksonville, Fla.). In other embodiments, the tackifiers include polyterpenes or terpene resins (e.g., SYLVARES® terpene resins from Arizona Chemical, Jacksonville, Fla.). In other embodiments, the tackifiers include aliphatic hydrocarbon resins such as resins resulting from the polymerization of monomers consisting of olefins and diolefins (e.g., ESCOREZ® 1310LC, ESCOREZ® 2596 from ExxonMobil Chemical Company, Houston, Tex.) and the hydrogenated derivatives thereof; alicyclic petroleum hydrocarbon resins and the hydrogenated derivatives thereof (e.g. ESCOREZ® 5300 and 5400 series from Exxonmobil Chemical Company; EASTOTAC® resins from Eastman Chemical, Kingsport, Tenn.). In further embodiments, the tackifiers are modified with tackifier modifiers including aromatic compounds (e.g., ESCOREZ® 2596 from ExxonMobil Chemical Company) and low softening point resins (e.g., AQUATAC 5527 from Arizona Chemical, Jacksonville, Fla.). In some embodiments, the tackifier is an aliphatic hydrocarbon resin having at least five carbon atoms. In other embodiments, the tackifier has a Ring and Ball (R&B) softening point equal to or greater than 80° C. The Ring and Ball (R&B) softening point can be measured by the method described in ASTM E28.

In some embodiments, the performance characteristics of the tackifier in the composition disclosed herein can be directly related to its compatibility with the ethylene/α-olefin interpolymer. Preferably, the compositions with desirable adhesive properties can be obtained with tackifiers that are compatible with the interpolymer. For example, when a compatible tackifier is added in the correct concentration to the interpolymer, desirable tack properties can be produced. Although incompatible tackifiers may not produce desirable tack properties, they may be used to impact other desirable properties. For example, the properties of the composition can be fine-tuned by the addition of a tackifier having limited compatibility to reduce the tack level and/or increase the cohesive strength characteristics.

Antioxidants

In some embodiments, the polymer blends disclosed herein optionally comprise an antioxidant that can prevent the oxidation of polymer components and organic additives in the polymer blends. Any antioxidant known to a person of ordinary skill in the art may be added to the polymer blends disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer blend can be from about greater than 0 to about 5 wt %, from about 0.0001 to about 2.5 wt %, from about 0.001 to about 1 wt %, or from about 0.001 to about 0.5 wt % of the total weight of the polymer blend. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

UV Stabilizers

In other embodiments, the polymer blends disclosed herein optionally comprise an UV stabilizer that may prevent or reduce the degradation of the polymer blends by UV radiations. Any UV stabilizer known to a person of ordinary skill in the art may be added to the polymer blends disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer blend can be from about greater than 0 to about 5 wt %, from about 0.01 to about 3 wt %, from about 0.1 to about 2 wt %, or from about 0.1 to about 1 wt % of the total weight of the polymer blend. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

Barrier Resins

Barrier resins are resins of all types which protects infiltration of contaminants, exfiltration of flavor, color, odor, etc., as well as preservation of the contents of an article made from the polymers blends provided herein. Exemplary barrier resins include, but are not limited to EVOH, PVDC, Nylon, PET, PP, PCTFE, COC, LCP, nitrile (AN-MA) copolymers, thermoplastic polyesters, tie layer resins, and vapor-permeable resins, and combinations thereof. The amount of barrier resin in the polymer blend can range from greater than 0% to about 10%, about 0.001% to about 10%, about 0.1% to about 8% or about 1% to about 5% of the total weight of the composition.

Pigments

In further embodiments, the polymer blends disclosed herein optionally comprise a colorant or pigment that can change the look of the polymer blends to human eyes. Any colorant or pigment known to a person of ordinary skill in the art may be added to the polymer blends disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer blend can be from about greater than 0 to about 10 wt %, from about 0.1 to about 5 wt %, or from about 0.25 to about 2 wt % of the total weight of the polymer blend. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Fillers

Optionally, the polymer blends disclosed herein can comprise a filler which can be used to adjust, inter alia, volume, weight, costs, and/or technical performance. Any filler known to a person of ordinary skill in the art may be added to the polymer blends disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof.

In some embodiments, the inclusion of an adsorptive inorganic additive has been found to improve the odor properties of the foamed products provided herein. The addition of an odor absorber additive such as charcoal, calcium carbonate or magnesium oxide in the range from about 0.1 to about 3 weight percent, or about 0.5 to about 2 weight percent, based on the total composition, is effective in eliminating odors.

Where used, the amount of the filler in the polymer blend can be from about greater than 0 to about 80 wt %, from about 0.1 to about 60 wt %, from about 0.5 to about 40 wt %, from about 1 to about 30 wt %, or from about 10 to about 40 wt % of the total weight of the polymer blend. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Lubricants

Optionally, the polymer blends disclosed herein can comprise a lubricant. In general, the lubricant can be used, inter alia, to modify the rheology of the molten polymer blends, to improve the surface finish of molded articles, and/or to facilitate the dispersion of fillers or pigments. Any lubricant known to a person of ordinary skill in the art may be added to the polymer blends disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. In some embodiments, lubricants comprise an organopolysiloxane. In some embodiments, the organopolysiloxane can have an average molecular weight not less than 40,000 and a viscosity of at least 50.000 cst.

Where used, the amount of the lubricant in the polymer blend can be from about greater than 0 to about 5 wt %, from about 0.1 to about 4 wt %, or from about 0.1 to about 3 wt % of the total weight of the polymer blend. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Antistatic Agents

Optionally, the polymer blends disclosed herein can comprise an antistatic agent. Generally, the antistatic agent can increase the conductivity of the polymer blends and to prevent static charge accumulation. Any antistatic agent known to a person of ordinary skill in the art may be added to the polymer blends disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer blend can be from about greater than 0 to about 5 wt %, from about 0.01 to about 3 wt %, or from about 0.1 to about 2 wt % of the total weight of the polymer blend. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

Cross-linking Agents

In further embodiments, the polymer blends disclosed herein optionally comprise a cross-linking agent that can be used to increase the cross-linking density of the polymer blends. Any cross-linking agent known to a person of ordinary skill in the art may be added to the polymer blends disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris (2-methoxyethoxy)silane, vinyltriacetoxysilane, vinylmethyldimethoxysilane, and 3-methacryloyloxypropyltrimethoxysilane). Where used, the amount of the cross-linking agent in the polymer blend can be from about greater than 0 to about 20 wt %, from about 0.1 to about 15 wt %, or from about 1 to about 10 wt % of the total weight of the polymer blend. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

The cross-linking of the polymer blends can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in embodiments of the invention.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range from about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example 0° C. to about 60° C., may also be employed. Preferably, the irradiation is carried out after shaping or fabrication of the article. Also, in a preferred embodiment, the ethylene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example,. triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have polyfunctional (i.e. at least two) moieties such as C=C, C=N or C=O.

At least one pro-rad additive can be introduced to the ethylene interpolymer by any method known in the art. However, preferably the pro-rad additive(s) is introduced via a masterbatch concentrate comprising the same or different base resin as the ethylene interpolymer. Preferably, the pro-rad additive concentration for the masterbatch is relatively high e.g., about 25 weight percent (based on the total weight of the concentrate).

The at least one pro-rad additive is introduced to the ethylene polymer in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the ethylene interpolymer.

In addition to electron-beam irradiation, crosslinking can also be effected by UV irradiation. U.S. Pat. No. 6,709,742 discloses a cross-linking method by UV irradiation which can be used in embodiments of the invention. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monacetals is the homolytic cleavage of the α-bond to give acyl and dialkoxyalkyl radicals. This type of α-cleavage is known as a Norrish Type I reaction which is more fully described in W. Horspool and D. Armesto, Organic Photochemistry: *A Comprehensive Treatment*, Ellis Horwood Limited, Chichester, England, 1992; J. Kopecky, *Organic Photochemistry: A Visual Approach*, VCH Publishers, Inc., New York, N.Y. 1992; N. J. Turro, et al., *Acc. Chem. Res.*, 1972, 5, 92; and J. T. Banks, et al., *J. Am. Chem. Soc.*, 1993, 115, 2473. The synthesis of monoacetals of aromatic 1,2 diketones, Ar—CO—C(OR)$_2$—Ar' is described in U.S. Pat. No. 4,190,602 and Ger. Offen. 2,337,813. The preferred compound from this class is 2,2-dimethoxy-2-phenylacetophenone, $C_6H_5$—CO—C(OCH$_3$)$_2$—$C_6H_5$, which is commercially available from Ciba-Geigy as Irgacure 651. Examples of other aromatic ketones useful in the practice of this invention as photoinitiators are Irgacure 184, 369, 819, 907 and 2959, all available from Ciba-Geigy.

In some embodiments of the invention, the photoinitiator is used in combination with a photocrosslinker. Any photocrosslinker that will upon the generation of free radicals, link two or more polyolefin backbones together through the formation of covalent bonds with the backbones can be used in this invention. Preferably these photocrosslinkers are polyfunctional, i.e., they comprise two or more sites that upon activation will form a covalent bond with a site on the backbone of the copolymer. Representative photocrosslinkers include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate and the like. Preferred photocrosslinkers for use in the present invention are compounds which have polyfunctional (i.e. at least two) moieties. Particularly preferred photocrosslinkers are triallycyanurate (TAC) and triallylisocyanurate (TAIC).

Certain compounds act as both a photoinitiator and a photocrosslinker in the practice of this invention. These compounds are characterized by the ability to generate two or more reactive species (e.g., free radicals, carbenes, nitrenes, etc.) upon exposure to UV-light and to subsequently covalently bond with two polymer chains. Any compound that can preform these two functions can be used in the practice of this invention, and representative compounds include the sulfonyl azides described in U.S. Pat. Nos. 6,211,302 and 6,284,842.

In another embodiment of this invention, the copolymer is subjected to secondary crosslinking, i.e., crosslinking other than and in addition to photocrosslinking. In this embodiment, the photoinitiator is used either in combination with a nonphotocrosslinker, e.g., a silane, or the copolymer is subjected to a secondary crosslinking procedure, e.g, exposure to E-beam radiation. Representative examples of silane crosslinkers are described in U.S. Pat. No. 5,824,718, and crosslinking through exposure to E-beam radiation is described in U.S. Pat. Nos. 5,525,257 and 5,324,576. The use of a photocrosslinker in this embodiment is optional At least one photoadditive, i.e., photoinitiator and optional photocrosslinker, can be introduced to the copolymer by any method known in the art. However, preferably the photoadditive(s) is (are) introduced via a masterbatch concentrate comprising the same or different base resin as the copolymer. Preferably ,the photoadditive concentration for the masterbatch is relatively high e.g., about 25 weight percent (based on the total weight of the concentrate).

The at least one photoadditive is introduced to the copolymer in any effective amount. Preferably, the at least one photoadditive introduction amount is from about 0.001 to about 5, more preferably from about 0.005 to about 2.5 and most preferably from about 0.015 to about 1, wt % (based on the total weight of the copolymer).

The photoinitiator(s) and optional photocrosslinker(s) can be added during different stages of the fiber or film manufacturing process. If photoadditives can withstand the extrusion temperature, a polyolefin resin can be mixed with additives before being fed into the extruder, e.g., via a masterbatch addition. Alternatively, additives can be introduced into the extruder just prior the slot die, but in this case the efficient mixing of components before extrusion is important. In another approach, polyolefin fibers can be drawn without photoadditives, and a photoinitiator and/or photocrosslinker can be applied to the extruded fiber via a kiss-roll, spray, dipping into a solution with additives, or by using other industrial methods for post-treatment. The resulting fiber with photoadditive(s) is then cured via electromagnetic radiation in a continuous or batch process. The photo additives can be blended with the polyolefin using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with a polyolefin resin, extruded into a fiber, and irradiated in a continuous process using one energy source or several units linked in a series. There are several advantages to using a continuous process compared with a batch process to cure a fiber or sheet of a knitted fabric which are collected onto a spool.

Irradiation may be accomplished by the use of UV-radiation. Preferably, UV-radiation is employed up to the intensity of 100 J/cm$^2$. The irradiation source can be any UV-light generator operating in a range from about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 J/cm$^2$ to about 500 J/scm$^2$, preferably between about 5 J/cm$^2$ to about 100 J/cm$^2$. Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the copolymer which has been incorporated with a photoadditive is irradiated with UV-radiation at about 10 J/cm$^2$ to about 50 J/cm$^2$.

Blowing Agents

Foaming agents suitable for use in the gaskets disclosed herein include physical blowing agents which function as gas sources by going through a change of physical state. Volatile liquids produce gas by passing from the liquid to gaseous state, whereas compressed gases are dissolved under pressure in the melted polymer. Chemical blowing agents produce gas by a chemical reaction, either by a thermal decomposition or by a reaction between two components.

Suitable physical blowing agents include pentanes (e.g., n-pentane, 2-methylbutane, 2,2-dimethylpropane, 1-pentane and cyclopentane), hexanes (e.g., n-hexane, 2-methylpentane, 3-methylpentane, 2,3-dimethylbutane, 2,2-dimethylbutane, 1-hexene, cyclohexane), heptanes (e.g., n-heptane, 2-methylhexane, 2,2-dimethylpentane, 2,3-dimethylpentane, 2,4-dimethylpentane, 3,3-dimethylpentane, 3-ethylpentane, 2,2,3-trimethylbutane, 1-heptene), benzene, toluene, dichloromethane, trichloromethane, trichloroethylene, tetrachloromethane, 1,2-dichloroethane, trichlorofluoromethane, 1,1,2-trichlorotrifluoroethane, methanol, ethanol, 2-propanol, ethyl ether, isopropyl ether, acetone, methyl ethyl ketone, and methylene chloride. Suitable gaseous blowing agents include carbon dioxide and nitrogen.

Suitable chemical blowing agents include sodium bicarbonate, dinitrosopentamethylenetetramine, sulfonyl hydrazides, azodicarbonamide (e.g., Celogen™ AZNP 130 made by Uniroyal Chemical), p-toluenesulfonyl semicarbazide, 5-phenyltetrazole, diisopropylhydrazodicarboxylate, 5-phenyl-3,6-dihydro-1,3,4-oxadiazin-2-one, and sodium borohydride.

The amount of blowing agent is dependent on the desired density reduction. One can calculate the amount of blowing agent required by knowing the volume of gas produced per gram of blowing agent at a given temperature and the desired density reduction (or target density) for a desired application. For chemical blowing agents the range is 0.1 to 4% by weight and more preferably 0.25 to 2% by weight. This range can also be adjusted by the addition of activation agents (sometimes referred to as coagents) such as (zinc oxide, zinc stearate).

Foams useful for making the gaskets claimed herein can be made as described in U.S. Pat. Nos. 5,288,762, 5,340,840, 5,369,136, 5,387,620 and 5,407,965, the disclosures of each of which are incorporated herein by reference in their entirety.

Preparation of the Polymer Blends

The ingredients of the polymer blends, i.e., the ethylene/α-olefin interpolymer, the at least one other polymer component, such as the elastomer, the polyolefin or the polar polymer and the optional additives, can be mixed or blended using methods known to a person of ordinary skill in the art, preferably methods that can provide a substantially homogeneous distribution of the polyolefin and/or the additives in the ethylene/α-olefin interpolymer. Non-limiting examples of suitable blending methods include melt blending, solvent blending, extruding, and the like.

In some embodiments, the ingredients of the polymer blends are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the polymer blend is formed by heating the contents of the vessel to a molten state while stirring.

In other embodiments, the ingredients of the polymer blends are processed using solvent blending. First, the ingredients of the desired polymer blend are dissolved in a suitable solvent and the mixture is then mixed or blended. Next, the solvent is removed to provide the polymer blend.

In further embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C.W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the polyolefin or the polymer blend. The mixing or blending of polymers by extrusion has been described in C. Rauwendaal, "*Polymer Extrusion*", Hanser Publishers, New York, N.Y., pages 322-334 (1986), which is incorporated herein by reference.

When one or more additives are required in the polymer blends, the desired amounts of the additives can be added in one charge or multiple charges to the ethylene/α-olefin interpolymer, the polyolefin or the polymer blend. Furthermore, the addition can take place in any order. In some embodiments, the additives are first added and mixed or blended with the ethylene/α-olefin interpolymer and then the additive-containing interpolymer is blended with the polyolefin. In other embodiments, the additives are first added and mixed or blended with the polyolefin and then the additive-containing polyolefin is blended with the ethylene/α-olefin interpolymer. In further embodiments, the ethylene/α-olefin interpolymer is blended with the polyolefin first and then the additives are blended with the polymer blend.

Alternatively, master batches containing high concentrations of the additives can be used. In general, master batches can be prepared by blending either the ethylene/α-olefin interpolymer, the polyolefin or the polymer blend with high concentrations of additives. The master batches can have additive concentrations from about 1 to about 50 wt %, from about 1 to about 40 wt %, from about 1 to about 30 wt %, or from about 1 to about 20 wt % of the total weight of the polymer blend. The master batches can then be added to the polymer blends in an amount determined to provide the desired additive concentrations in the end products. In some embodiments, the master batch contains a slip agent, an anti-blocking agent, a plasticizer, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent, or a combination thereof. In other embodiment, the master batch contains a slip agent, an anti-blocking agent or a combination thereof. In other embodiment, the master batch contains a slip agent.

Applications of Polymer Blends

The polymer blends disclosed herein can be used to manufacture durable articles for the automotive, construction, medical, food and beverage, electrical, appliance, business machine, and consumer markets. In some embodiments, the polymer blends are used to manufacture flexible durable parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles. In other embodiments, the polymer blends can be used to manufacture durable parts or articles that require a high tensile strength and low compression set. In further embodiments, the polymer blends can be used to manufacture durable parts or articles that require a high upper service temperature and low modulus.

Gasket Configurations

Gaskets can have many different forms, including "o-rings" and flat seals (e.g., "film-like" gaskets having a thickness commensurate with the intended use).

Suitable end uses include gaskets for metal and plastic closures, as well as other gasket applications. These applications include beverage cap liners, hot fill juice cap liners, polypropylene cap liners, steel or aluminum cap liners, high density polyethylene cap liners, window glass gaskets, sealed containers, closure caps, gaskets for medical devices, filter elements, pressure venting gaskets, hot melt gaskets, easy twist off caps, electrochemical cell gaskets, refrigerator gaskets, galvanic cell gaskets, leak proof cell gaskets, waterproofing sheet, reusable gaskets, synthetic cork like materials, thin cell electromembrane separator, magnetic rubber materials, disc gaskets for alcoholic beverage bottle caps, freeze resistant seal rings, gaskets for plastic castings, expansion joints and waterstops, corrosion-resistant conduit connectors, flexible magnetic plastics, pipe joint seals, integral weatherproof plastic lid and hinge for electrical outlets, magnetic faced foamed articles, jar rings, flexible gaskets, glass seals, tamper evident sealing liners, pressure applicators, combined bottle cap and straw structures, large condiment bottle liners, metal caps for applesauce or salsa jars, home canning jars, "crowns," and the like.

Gaskets made from the substantially linear or homogeneous linear ethylene polymers have numerous advantages, especially when used in food-stuff applications. These include: improved taste and odor over incumbent polymer gaskets such as ethylene/vinyl acetate; low adhesion to polar substrates (e.g., polyethylene terephthalate, glass) which is useful for low torque removal of the closure/cap; low extractables (e.g., less than about 5.5% by weight) (also useful for food-stuffs, especially regarding regulatory compliance); good adhesion to non-polar substrates (e.g., polypropylene and high density polyethylene (either linear homopolymer polyethylene or linear heterogeneous high density polyethylene)); Good adhesion in a cap or crown can be described as sufficiently adhering to the substrate. A gasket exhibits this type adhesion when it can only be removed under a cohesive failure mode. Adhesion to metal (such as beer crowns) requires a lacquer that is both compatible with the polymer system and bonds to the metal. One such example that provides good adhesion is a modified polyester provided by Watson Standard (#40-207). Modified epoxy lacquers have also demonstrated good adhesion. Additional benefits include adequate gas and water barrier properties; high melting point relative to incumbent polymers (e.g., ethylene/vinyl acetate); good stress crack resistance; good chemical resistance; variable hardness (useful for specific packaging which may require more or less gasket stiffness, depending on the degree of torque required to seal the container and the internal pressure of the container).

In certain embodiments, the ethylene/alpha-olefin polymers used in the present invention are present in the three component composition used in the gasket in an amount in the range from about 80% to about 97.5% by total weight of the three component composition. Preferably, the ethylene/alpha-olefin polymers used in the present invention can be found in the three component gasket compositions in the range from about 85% to about 97.5%. More preferably, the ethylene/alpha-olefin polymers used in the present invention can be found in the gasket composition in the range of about 90% to about 97.5%. The three component composition can be admixed with other materials, such as styrene/butadiene/styrene block polymers ("SBS"). Preferably, the three component composition comprises from about 50 percent, especially from about 80 percent, to 100 percent of the gasket, by weight of the gasket.

The gaskets comprising the ethylene/alpha-olefin polymers used in the present invention should be hard enough to withstand compression, but still soft enough such that an adequate seal is formed. Thus, the hardness of the polymer enables varying gaskets to be made, depending on the use. Hardness is measured herein as "Shore A" hardness (as determined using ASTM D-2240). For the ethylene/alpha-olefin polymers used in the present invention which comprise the gaskets, the Shore A hardness ranges from about 50 to about 100, even without the use of petroleum oils commonly included to reduce the hardness of the polymer and resulting gasket.

In some embodiments, the gaskets provided herein comprise additives such as antioxidants (e.g., hindered phenolics (e.g., Irganox.RTM. 1010 made by Ciba Geigy Corp.), phosphites (e.g., Irgafos.RTM. 168 made by Ciba Geigy Corp.)), cling additives (e.g., polyisobutylene (PIB)), slip additives (e.g., erucamide), antiblock additives, pigments, and the like can also be included in the gasket compositions, to the extent that they do not interfere with the improved properties described herein.

Various gasket manufacturing techniques include those disclosed in U.S. Pat. No. 5,215,587 (McConnellogue et al.); U.S. Pat. No. 4,085,186 (Rainer); U.S. Pat. No. 4,619,848 (Knight et al.); U.S. Pat. No. 5,104,710 (Knight); U.S. Pat. No. 4,981,231 (Knight); U.S. Pat. No. 4,717,034 (Mumford); U.S. Pat. No. 3,786,954 (Shull); U.S. Pat. No. 3,779,965 (Lefforge et al.); U.S. Pat. No. 3,493,453 (Ceresa et al.); U.S. Pat. No. 3,183,144 (Caviglia); U.S. Pat. No. 3,300,072 (Caviglia); U.S. Pat. No. 4,984,703 (Burzynski); U.S. Pat. No. 3,414,938 (Caviglia); U.S. Pat. No. 4,939,859 (Bayer); U.S. Pat. No. 5,137,164 (Bayer); and U.S. Pat. No. 5,000,992 (Kelch). The disclosure of each of the preceding United States patents is incorporated herein in its entirety by reference. Preferably, the gasket is made in a single step process by extruding a portion of the foaming ethylene/alpha-olefin polymers used in the present invention and then immediately compression molding that portion into a gasket, especially where the gasket adheres to a substrate such as phenolic, epoxy or polyester lacqueres.

The gaskets claimed herein are different from those gaskets made by extruded sheets or films by conventional techniques as blown, cast or extrusion coated films, followed by stamping or cutting the gasket from the sheet or film since substantial waste is avoided and more control over gasket dimensions in 1-step process; another advantage of the 1-step process is achieving lower gasket thickness (e.g., from about 5 mils to about 50 mils).

Preferably, the 1-step process for forming a gasket having a Shore A hardness from about 40 to about 95, comprising the steps of:

(a) combining at least one ethylene/alpha-olefin interpolymer having the properties specified herein, at least one ethylene/carboxylic acid interpolymer or ionomer thereof, at least one slip agent, with at least one blowing agent to from a mixture,
(b) extruding the mixture into a pellet,
(c) cutting the extruded mixture into a pellet,
(d) positioning the cut extruded mixture into a closure, and
(e) compression shaping the positioned mixture in the closure. More preferably, for closures having a 28 mm diameter, the cut pellet weighs from about 120 mg to about 300 mg.

Multilayer film structures are also suitable for making the gaskets disclosed herein, with the proviso that at least one layer (preferably the inner layer which is located adjacent to the product) comprises the homogeneously branched linear or homogeneously branched substantially linear ethylene interpolymer. Foam multilayer gaskets comprising the homogeneously branched linear or homogenously branched substantially linear ethylene interpolymers are also useful in the present invention.

In some embodiments, the polymer blends disclosed herein can be used to manufacture gaskets with improved taste and odor properties. The use of ethylene/α-olefin interpolymers offer less sensitivity to temperature, for example in the range from below 40° F. to 158° F., for key closure liner or gasket physical properties. The ethylene/α-olefin interpolymers show reduced change in properties versus other polymer systems, over the temperature range from below 40° F. to 158° F. The key polymer properties are relatively insensitive to temperature in the key operational temperature range.

The sealing gasket compositions of the present invention may also include various other components that are known to those skilled in the art. Examples of other materials which may be included in the gasket composition are a lubricants and colorants. Examples of suitable lubricants include, but are not limited to, stearates and fatty amides, such as Kemmamide-E™ (also called erucamide), which can be obtained from the Witco Corporation. Examples of suitable, colorants include, but are not limited to, thaloblue, which may be obtained from Quantum Chemical Corporation.

For closure liner application used in more extreme conditions, the addition of 30% or less of a very high molecular weight elastomer such as an SEBS polymer of melt index less than 0.1 to ethylene/α-olefin interpolymers can result in a composition with physical properties similar to a the very high molecular weight elastomer. This blend composition offers advantages over the very high molecular weight elastomer including: improved processability and reduced cost. The very high molecular weight elastomers by themselves have such high viscosity that they can not be processed in production equipment used to produce closure liners.

The ethylene/α-olefin interpolymers offer unique, advantaged combinations of properties of processability and physical properties that unmodified elastomers do not possess. In particular, elastomers such as SEBS should be of very high molecular weight to exhibit the physical properties required for closure liner application but at these molecular weight the elastomers are totally unprocessable in standard closure liner equipment. Typically these polymers must be modified with extenders and other polymers to obtain sufficient processability.

The ethylene/α-olefin interpolymers blends with polyolefin polymers, such as LLDPE, SEBS, and others show synergistic effect in compression set.

Manufacture of Articles

The polymer blends can be used to prepare these durable parts or articles with known polymer processes such as extrusion (e.g., sheet extrusion and profile extrusion), injection molding, molding, rotational molding, and blow molding. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming. The rotational molding of polymers has been described in Glenn Beall, "*Rotational Molding: Design, Materials & Processing*," Hanser Gardner Publications, Cincinnati, Ohio (1998), which is incorporated herein by reference in its entirety.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene. The blow molding of polymers has been described in Norman C. Lee, "*Understanding Blow Molding*," Hanser Gardner Publications, Cincinnati, Ohio (2000), which is incorporated herein by reference in its entirety.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (µm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 µl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. Ali infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to –40° C. at 10° C./min cooling rate and held at –40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between –30° C. and end of melting. The heat of fusion is measured as the area under the melting curve between –30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431 (M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or I10 is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di(t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene)(1-N-(1-methylethyl)immino)methyl)(2-oxoyl) zirconium dibenzyl A solution of (1-methylethyl)(2-hydroxy-3,5-di(t-butyl)phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl)(2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi(C$_{14-18}$ alkyl)ammonium salts of tetrakis(pentafluorophenyl)borate (here-in-after armeenium borate), prepared by reaction of a long chain trialkylamine (Armeen™ rm M2HT, available from Akzo-Nobel, Inc.), HCl and Li[B(C$_6$F$_5$)$_4$], substantially as disclosed in U.S. Pat. No. 5,919,9883, Ex. 2.

Cocatalyst 2 Mixed C$_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl(t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide) (SA18), ethylzinc (2,6-diphenylphenoxide) (SA19), and ethylzinc (t-butoxide) (SA20).

Examples 1-4, Comparative Examples A*-C*

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |

TABLE 1-continued

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for Comparative Example A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for Comparative Example B* shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for Comparative Example C* shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19, Comparative Examples D*-F*, Continuous Solution Polymerization, Catalyst A1/B2+DEZ Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [$C_2H_4$]/ [DEZ][4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |

TABLE 2-continued

Process details for preparation of exemplary polymers

| Ex. | C$_8$H$_{16}$ kg/hr | Solv. kg/hr | H$_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C$_2$H$_4$]/ [DEZ][4] | Poly Rate[5] kg/hr | Conv %[6] | Solids % | Eff.[7] |
|---|---|---|---|---|---|---|---|---|---|---|---|---|---|---|---|---|---|
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | " | " | " | 0.10 | 30.4 | 0.08 | 0.17 | 0.32 | " | 0.18 | 570 | 1.65 | 89.3 | 11.1 | 172.7 |
| 7 | " | " | 4.92 | " | " | 0.07 | 30.8 | 0.06 | 0.17 | 0.25 | " | 0.13 | 718 | 1.60 | 89.2 | 10.6 | 244.1 |
| 8 | " | " | 21.70 | " | " | 0.06 | " | " | " | 0.10 | " | 0.12 | 1778 | 1.62 | 90.0 | 10.8 | 261.1 |
| 9 | " | " | 36.90 | " | " | " | " | " | " | 0.04 | " | " | 4596 | 1.63 | 90.2 | 10.8 | 267.9 |
| 10 | " | " | 78.43 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | 0.00 | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1] standard cm$^3$/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] molar ratio in reactor
[5] polymer production rate
[6] percent ethylene conversion in reactor
[7] efficiency, kg polymer/g M where g M = g Hf + g Zr

TABLE 3

Properties of exemplary polymers

| Ex. | Density (g/cm$^3$) | I$_2$ | I$_{10}$ | I$_{10}$/I$_2$ | Mw (g/mol) | Mn (g/mol) | Mw/Mn | Heat of Fusion (J/g) | T$_m$ (°C.) | T$_c$ (°C.) | T$_{CRYSTAF}$ (°C.) | Tm − T$_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of Comparative Example D* shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of Comparative Example E* shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of Comparative Example F* shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative Example G* is a substantially linear ethylene/1-octene copolymer (AFFINITY®, available from The Dow Chemical Company), Comparative Example H* is an elastomeric, substantially linear ethylene/1-octene copolymer (AFFINITY®EG8100, available from The Dow Chemical Company), Comparative Example I* is a substantially linear ethylene/1-octene copolymer (AFFINITY®PL 1840, available from The Dow Chemical Company), Comparative Example J* is a hydrogenated styrene/butadiene/styrene tri-block copolymer (KRATON™ G1652, available from KRATON Polymers), Comparative Example K* is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |

TABLE 4-continued

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative Example F* (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative Example J* (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative Example F*) has a storage modulus ratio of 9 and a random ethylene/octene copolymer (Comparative Example G*) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparative Examples F* and G* which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparative Examples F*, G*, H* and J* all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |

TABLE 5-continued

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm³, preferably less than about 80 mm³, and especially less than about 50 mm³. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F*, G* and H* have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative Example G*. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |

TABLE 6-continued

Polymer Optical Properties

| Ex. | Internal Haze (percent) | Clarity (percent) | 45° Gloss (percent) |
|---|---|---|---|
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative Example E* are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}C$ NMR

Additional Polymer Examples 19 A-F, Continuous Solution Polymerization, Catalyst A1/B2+DEZ Continuous solution polymerizations are carried out in a computer controlled well-mixed reactor. Purified mixed alkanes solvent (Isopar™ E available from ExxonMobil Chemical Company), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

Process details and results are contained in Table 8. Selected polymer properties are provided in Table 9 and Table 9A.

TABLE 8

Polymerization Conditions

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19a | 55.29 | 32.03 | 323.03 | 101 | 120 | 600 | 0.25 | 200 | 0.42 | 3.0 | 0.70 |
| 19b | 53.95 | 28.96 | 325.3 | 577 | 120 | 600 | 0.25 | 200 | 0.55 | 3.0 | 0.24 |
| 19c | 55.53 | 30.97 | 324.37 | 550 | 120 | 600 | 0.216 | 200 | 0.609 | 3.0 | 0.69 |
| 19d | 54.83 | 30.58 | 326.33 | 60 | 120 | 600 | 0.22 | 200 | 0.63 | 3.0 | 1.39 |
| 19e | 54.95 | 31.73 | 326.75 | 251 | 120 | 600 | 0.21 | 200 | 0.61 | 3.0 | 1.04 |
| 19f | 50.43 | 34.80 | 330.33 | 124 | 120 | 600 | 0.20 | 200 | 0.60 | 3.0 | 0.74 |
| 19g | 50.25 | 33.08 | 325.61 | 188 | 120 | 600 | 0.19 | 200 | 0.59 | 3.0 | 0.54 |
| 19h | 50.15 | 34.87 | 318.17 | 58 | 120 | 600 | 0.21 | 200 | 0.66 | 3.0 | 0.70 |
| 19i | 55.02 | 34.02 | 323.59 | 53 | 120 | 600 | 0.44 | 200 | 0.74 | 3.0 | 1.72 |
| 19k | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | [Zn][4] in polymer ppm | Poly Rate[5] lb/hr | Conv[6] wt % | Polymer wt % | Eff[7] |
|---|---|---|---|---|---|---|---|---|---|
| 19a | 4500 | 0.65 | 525 | 0.33 | 248 | 83.94 | 88.0 | 17.28 | 297 |
| 19b | 4500 | 0.63 | 525 | 0.11 | 90 | 80.72 | 88.1 | 17.2 | 295 |
| 19c | 4500 | 0.61 | 525 | 0.33 | 246 | 84.13 | 88.9 | 17.16 | 293 |
| 19d | 4500 | 0.66 | 525 | 0.66 | 491 | 82.56 | 88.1 | 17.07 | 280 |
| 19e | 4500 | 0.64 | 525 | 0.49 | 368 | 84.11 | 88.4 | 17.43 | 288 |
| 19f | 4500 | 0.52 | 525 | 0.35 | 257 | 85.31 | 87.5 | 17.09 | 319 |
| 19g | 4500 | 0.51 | 525 | 0.16 | 194 | 83.72 | 87.5 | 17.34 | 333 |
| 19h | 4500 | 0.52 | 525 | 0.70 | 259 | 83.21 | 88.0 | 17.46 | 312 |
| 19i | 4500 | 0.70 | 525 | 1.65 | 600 | 86.63 | 88.0 | 17.6 | 275 |
| 19k | — | — | — | — | — | — | — | — | — |

[1]standard $cm^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethyl
[4]ppm in final product calculated by mass balance
[5]polymer production rate
[6]weight percent ethylene conversion in reactor
[7]efficiency, kg polymer/g M where g M = g Hf + g Z

TABLE 9

Polymer Physical properties

| Polymer Ex. No. | Density (g/cc) | I2 | I10 | I10/I2 | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19g | 0.8649 | 0.9 | 6.4 | 7.1 | 135000 | 64800 | 2.1 | 26 | 120 | 92 | 30 | 90 | 90 |
| 19h | 0.8654 | 1.0 | 7.0 | 7.1 | 131600 | 66900 | 2.0 | 26 | 118 | 88 | — | — | — |

TABLE 9A

Average Block Index For exemplary polymers[1]

| Example | Zn/C$_2$[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the calculation of the block indices for various polymers is disclosed in U.S. Patent Application Ser. No. _____ (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2] Zn/C$_2$ * 1000 = (Zn feed flow * Zn concentration/1000000/Mw of Zn)/(Total Ethylene feed flow * (1 − fractional ethylene conversion rate)/Mw of Ethylene) * 1000.
Please note that "Zn" in "Zn/C$_2$ * 1000" refers to the amount of zinc in diethyl zinc ("DEZ") used in the polymerization process, and "C2" refers to the amount of ethylene used in the polymerization process.

Polymer Examples 20-25 and Comparative Examples A-E

Various multi-block copolymers having differing degrees of soft segment to hard segment weight ratios are compared to physical blends of metallocene polymers and Ziegler Natta produced polymers at similar soft to hard segment ratios to show how the blocked structure of the backbone performs differently from a physical blend of the same type of segments. Various physical properties, including compression set, abrasion resistance, can be improved. Maintaining a low Shore hardness value is especially useful in forming gaskets and closures. The addition of a carboxylic acid copolymer and/or amide slip agents enhances some of these performance properties.

TABLE 10

| Polymer Example | Melt Index, g/10 min | Overall Density, g/cm$^3$ | Soft Segment/Hard Segment Ratio | Zinc in Polymer ppm |
|---|---|---|---|---|
| 20 | 1 | 0.877 | 70/30 | 250 |
| 21 | 1 | 0.877 | 70/30 | 188 |
| 22 | 1 | 0.877 | 70/30 | 88 |
| 23 | 5 | 0.877 | 70/30 | 500 |
| 24 | 1 | 0.866 | 85/15 | 250 |
| 25 | 1 | 0.893 | 50/50 | >500 |
| A** | 39.2 | 14.2 | 70/30 | 20.9 |
| B** | 71.8 | 17.7 | 5050 | 34.7 |
| C** | 13.4 | 18.2 | NA | 21.4 |
| D** | 11.0 | 11.7 | NA | 23.0 |
| E** | 51.0 | 31.2 | NA | 44.9 |

NA = Not applicable
**= Comparative Example
A = ENGAGE ®* 8842 (1 melt index, 0.857 g/cm3, I10/I2 of about 8.3, metallocene)/DOWLEX ®* 2042 (7.7 melt index, 0.93 g/cm3, Ziegler Natta)
B = ENGAGE ®*/DOWLEX ®* 2042 Blend
C = AFFINITY ®* 8100 (1 melt index, 0.87 g/cm3, Mw/Mn about 2, metallocene)
D = AFFINITY ®* 8200 (5 melt index, 0.87 g/cm3, metallocene)
E = AFFINITY ®* PF 1140 (1.6 melt index, 0.8965 g/cm3, metallocene)
*Trademark of The Dow Chemical Co.
All polymers are ethylene/1-octene copolymers

TABLE 11

| Example | Flexural Modulus (Mpa) | Tensile Elastomer (Mpa) | Trouser Tear (N/mm) | Comp. set (23° C. 72 hrs) | Comp. set (70° C. 24 hrs) | Hardness shore A 15 sec | Hardness shore D 15 sec | Abrasion DIN (mm3) | Density (g/cc) |
|---|---|---|---|---|---|---|---|---|---|
| 20 | 24.3 | 19.3 | 28.0 | 14.4 | 39.1 | 77.3 | 22.7 | 51.2 | 0.8785 |
| 21 | 24.6 | 19.4 | 28.3 | 14.0 | 35.6 | 76.4 | 22.8 | 48.3 | 0.8786 |
| 22 | 21.2 | 18.5 | 24.3 | 17.6 | 44.4 | 74.9 | 21.8 | 54.1 | 0.8775 |
| 23 | 18.7 | 12.1 | 27.4 | 16.9 | 51.3 | 72.7 | 19.2 | 98.5 | 0.8768 |
| 24 | 8.4 | 14.8 | 19.1 | 18.5 | 59.1 | 56.5 | 12.7 | 151.0 | 0.8653 |
| 25 | 57.8 | 24.0 | 40.4 | 15.0 | 33.7 | 89.5 | 32.5 | 31.3 | 0.8915 |
| A** | 39.2 | 14.2 | 20.9 | 32.8 | 76.6 | 72.9 | 21.3 | 213.8 | 0.879 |
| B** | 71.8 | 17.7 | 34.7 | 26.9 | 60.1 | 89.0 | 32.3 | 102.6 | 0.8919 |
| C** | 13.4 | 18.2 | 21.4 | 39.2 | 98.1 | 73.1 | 21.1 | 107.5 | 0.873 |
| D** | 11.0 | 11.7 | 23.0 | 39.2 | 88.9 | 70.7 | 18.9 | 208.8 | 0.8719 |
| E** | 51.0 | 31.2 | 44.9 | 30.4 | 78.8 | 91.6 | 37.8 | 18.8 | 0.8955 |

Examples of Polymer Blend Compositions

Polymer blend compositions comprising the ethylene/α-olefin interpolymers of Examples 26-28 and at least one other polymer were prepared, evaluated and tested for properties. Ethylene/α-olefin interpolymers of Examples 26-28 were made according to procedures similar to thoese described herein. The melt index and overall density for these ethylene/α-olefin interpolymers is provided below:

| Example No. | Oveall Density | $I_2$ |
|---|---|---|
| Polymer Example 26 | 0.877 | 1 |
| Polymer Example 27 | 0.878 | 5 |
| Polymer Example 28 | 0.878 | 15 |

The following methods were used to determine the properties of the blends:

| | |
|---|---|
| 100% Modulus, MPa | Modulus at 100% elongation, with crosshead velocity of 500 mm/min, measured in mega Pascals, according to ISO 37 Type 1, (1994). |
| UTS, MPa | Ultimate tensile strength, with crosshead velocity of 500 mm/min, measured in mega Pascals, according to ISO 37 Type 1 (1994). |
| Ult. Elong. % | Ultimate elongation percent, with crosshead velocity of 500 mm/min, according to ISO 37 Type 1 (1994). |
| Tear Strength, kN/m | Tear strength, with crosshead velocity of 500 mm/min, measured in kN/m, according to ISO 34 Method B (1994). |
| Hardness | Shore A durometer hardness measured at 15 seconds and at room temperature (23° C.), according to ISO 868 (1985). |
| Compression Set, % | Compression set, at 125° C. for 70 hours, measured as a percentage, according to ISO 815 Type A, plied sample (1991). |
| Oil Swell, wt. % | Oil swell, at 125° C. for 70 hours using IRM903 oil, measured in percent by weight, according to ISO 1817 (1999). |
| Gel Content, % | Percent gel content, or crosslinked EPDM, measured by soaking ~1 g of chopped (≦1 mm) pellets in ~100 g of cyclohexane at 23° C. for 48 hours, and weighing the dried residue, then subtracting the weight of the components soluble in cyclohexane, other than rubber, such as extender oil, antioxidant, light Stabilizer, etc. |
| Shear Viscosity | Apparent viscosity was measured at 230° C. with a capillary die 15 × 1 mm, according to ASTM D-3835 (1996), at an apparent shear rate of 500 sec$^{-1}$. |

Tables 12 and 13 provides various ingredients used in the blends and properties of the blend compositions.

TABLE 12

Polymer properties for exemplary polymer blends

| Blend Composition | Compression Set for 22 Hours - 23 C. (73 F.) | Compression Set for 22 Hours - 70 C. (158 F.) | COF (on Metal) - dynamic | COF (on Metal) - static | Density - 40 Hours @ B-3833 | Hardness (Shore A) | Avg % ELON-GATION (%) |
|---|---|---|---|---|---|---|---|
| Comparative Resins | | | | | | | |
| EVA | 25.8 | ND | 0.63 | 0.96 | 0.9312 | 80.2 | 619 |
| Septon ® 8006 | 8.2 | 29.3% | ND | ND | ND | ND | ND |
| Kraton G 1562 | 12.7 | 98.4% | ND | ND | ND | ND | ND |
| Nexprene ® 9055 | 17.6 | 26.4% | ND | ND | ND | ND | ND |
| Engage ® 8770 | 23.9 | ND | ND | ND | 0.8850 | 86.0 | ND |
| Engage ® 8100 | 20.1 | 84.7% | ND | ND | 0.8790 | 62.0 | ND |
| Affinity ® SM 1300 | ND | ND | ND | ND | ND | ND | ND |
| Ethylene/α-olefin interpolymer containing polymer blend compositions | ND | ND | ND | ND | ND | ND | ND |
| 83.33% Polymer Example 28/14.67% Polymer Example 26/2.00% Kemamide E Ultra | 30.5 | 59.8% | 2.00 | 2.00 | 0.8786 | 76.8 | 1280 |
| 27.93% Polymer Example 26/70.70% LLDPE 2517/2.00% Kemamide E Ultra | 43.4 | ND | 0.29 | 0.46 | 0.9057 | 85.2 | 900 |
| 98.00% Polymer Example 28/2.00% Kemamide E Ultra | 28.2 | 64.2% | 2.00 | 2.00 | 0.8766 | 76.6 | 249 |
| 89.00% Polymer Example 28/09.00% Elvax ® 650Q/2.00% Kemamide E Ultra | 29.4 | 63.9% | 2.00 | 2.00 | 0.8829 | 69.2 | 1126 |
| 89.00% Polymer Example 28/09.00% Elvax ® 750/2.00% Kemamide E Ultra | 28.6 | 61.0% | 2.00 | 2.00 | 0.8827 | 72.6 | 1087 |
| 83.30% Polymer Example 28/14.70% Versify ™ DE 3300.01/2.00% Kemamide E Ultra | 28.5 | 67.3% | 2.00 | 2.00 | 0.8768 | 75.4 | ND |
| 68.60% Polymer Example 28/29.40% Versify ™ DE 3300.01/2.00% Kemamide E Ultra | 36.6 | 72.9% | 2.00 | 2.00 | 0.8755 | 71.8 | 996 |
| 83.30% Polymer Example 28/14.70% Versify ™ DE 3300.01/2.00% Kemamide E Ultra | 28.4 | 63.4% | 1.87 | 2.00 | 0.8798 | 76.2 | 495 |
| 68.60% Polymer Example 28/29.40% Versify ™ DE 3300.01/2.00% Kemamide E Ultra | 30.5 | 65.4% | 1.59 | 1.85 | 0.8817 | 83.2 | 366 |
| 29.40% Polymer Example 28/68.60% LDPE 722/2.00% Kemamide E Ultra | 39.6 | 72.6% | 0.29 | 0.41 | 0.9066 | 84.4 | 698 |
| 49.00% Polymer Example 28/49.00% LDPE 722/2.00% Kemamide E Ultra | 36.6 | 68.0% | 0.56 | 0.73 | 0.8982 | 80.8 | 788 |
| 68.60% Polymer Example 28/29.40% LDPE 722/2.00% Kemamide E Ultra | 34.8 | 65.0% | 1.19 | 1.51 | 0.8899 | 80.0 | 661 |
| 55.76% Polymer Example 27/42.24% LLDPE 2517/2.00% Kemamide E Ultra | 37.0 | 61.5% | 0.91 | 1.30 | 0.8947 | 79.0 | 973 |
| 68.60% Polymer Example 28/29.40% Septon ® 4055/2.00% Kemamide E Ultra | ND | 51.5% | 2.00 | 2.00 | 0.8864 | 70.6 | 828 |
| 75.65% Polymer Example 28/13.35% Versify ™ 3000.01/09.00% Elvax ® 650Q/2.00% Kemamide E Ultra | 27.3 | 65.8% | 2.00 | 2.00 | 0.8849 | 73.4 | 522 |
| 75.65% Polymer Example 28/13.35% Versify ™ 3000.01/09.00% Elvax ® 750/2.00% Kemamide E Ultra | 25.1 | 63.9% | 2.00 | 2.00 | 0.8841 | 75.4 | 590 |
| 43.80% Polymer Example 26/29.20% Septon ® 4055/25.00% Affinity ® GA 1950/2.00% Kemamide E Ultra | 27.9 | ND | 2.00 | 2.00 | 0.8860 | 70.4 | 731 |
| 43.80% Polymer Example 26/29.20% Septon ® 8006/25.00% Affinity ® GA 1950/2.00% Kemamide E Ultra | 27.5 | ND | 2.00 | 2.00 | 0.8894 | 67.4 | ND |
| 68.60% Polymer Example 28/29.40% DMDA-8007/2.00% Kemamide E Ultra | 46.8 | ND | 0.77 | 1.02 | 0.8997 | 82.6 | 333 |
| 68.60% Polymer Example 28/29.40% hPP H700-12/2.00% Kemamide E Ultra | 37.0 | 78.2% | 1.17 | 1.74 | 0.8846 | 79.2 | 158 |
| 88.20% Polymer Example 28/09.80% hPP H700-12/2.00% Kemamide E Ultra | 28.1 | 62.3% | 1.99 | 2.00 | 0.8800 | 71.6 | 787 |
| 71.52% Polymer Example 26/26.48% DMDA-8965/2.00% Kemamide E Ultra | 42.7 | ND | 0.87 | 1.33 | 0.8966 | 81.6 | 885 |
| 75.65% Polymer Example 28/13.35% Versify ™ 3000.01/2.00% Kemamide E Ultra | 25.1 | ND | 1.90 | 1.97 | 0.8834 | 75.8 | 518 |
| 48.00% Polymer Example 28/48.00% LDPE 722/4.00% MB-50-002 | ND | ND | 1.63 | 1.82 | ND | ND | ND |
| 98.00% AFFINITY ® SM 1300G/2.00% Kemamide E Ultra | 21.4 | ND | 0.58 | 0.94 | 0.9050 | 77.4 | 835 |
| 98.00% Elvax ® 650Q/2.00% Kemamide E Ultra | 25.8 | ND | 0.63 | 0.96 | 0.9312 | 80.2 | 619 |
| 68.60% Polymer Example 26/29.40% Septon ® 4055/2.00% Kemamide E Ultra/ | ND | ND | 2.00 | 2.00 | 0.8865 | 72.2 | 689 |
| 49.80% Polymer Example 26/33.20% Septon ® 4055/15.00% Affinity ® GA 1950/2.00% Kemamide E Ultra/ | ND | ND | 2.00 | 2.00 | 0.8870 | 71.4 | 696 |

ND = Not determined

TABLE 13

Polymer properties for exemplary polymer blends

| Blend Composition | Avg Adj Gage Len1 (In) | Avg Adj Gage Len2 (In) | Avg Off Yield Load (Lb) | 100% Modulus | 300% Modulus | Avg Thickness (In) | Avg Ultimate (Psi) | Avg Width (In) | Avg Yield Strain (%) | Avg Yield Strength (Psi) |
|---|---|---|---|---|---|---|---|---|---|---|
| Comparative Resins | | | | | | | | | | |
| EVA | 1.00 | 2.50 | 17.18 | 876 | 296 | 0.109 | 1377 | 0.25 | 8.56 | 628 |
| Septon ® 8006 | | | | | | | | | | |
| Kraton G 1562 | | | | | | | | | | |
| Nexprene ® 9055 | | | | | | | | | | |
| Engage ® 8770 | | | | | | | | | | |
| Engage ® 8100 | | | | | | | | | | |
| Affinity ® SM 1300 | | | | | | | | | | |
| Ethylene/α-olefin interpolymer containing polymer blend compositions | | | | | | | | | | |
| 83.33% Polymer Example 28/14.67% Polymer Example 26/2.00% Kemamide E Ultra | 1.00 | 2.50 | 6.60 | 1236 | 529 | 0.121 | 569 | 0.25 | 8.06 | 218 |
| 27.93% Polymer Example 26/70.70% LLDPE 2517/2.00% Kemamide E Ultra | 1.00 | 2.50 | 22.44 | 877 | 282 | 0.111 | 1830 | 0.25 | 6.72 | 805 |
| 98.00% Polymer Example 28/2.00% Kemamide E Ultra | 1.00 | 2.50 | 6.42 | 1226 | 523 | 0.117 | 433 | 0.25 | 8.07 | 219 |
| 89.00% Polymer Example 28/09.00% Elvax ® 650Q/2.00% Kemamide E Ultra | 1.00 | 2.50 | 6.16 | 387 | 145 | 0.111 | 497 | 0.25 | 7.93 | 221 |
| 89.00% Polymer Example 28/09.00% Elvax ® 750/2.00% Kemamide E Ultra | 1.00 | 2.50 | 5.94 | 394 | 145 | 0.107 | 488 | 0.25 | 6.90 | 221 |
| 83.30% Polymer Example 28/14.70% Versify ™ DE 3300.01/2.00% Kemamide E Ultra | ND | ND | ND | ND | ND | ND | ND | ND | ND | ND |
| 68.60% Polymer Example 28/29.40% Versify ™ DE 3300.01/2.00% Kemamide E Ultra | 1.00 | 2.50 | 6.18 | 1181 | 441 | 0.112 | 332 | 0.25 | 6.99 | 220 |
| 83.30% Polymer Example 28/14.70% Versify ™ DE 3300.01/2.00% Kemamide E Ultra | 1.00 | 2.50 | 7.30 | 1471 | 635 | 0.111 | 401 | 0.25 | 8.03 | 262 |
| 68.60% Polymer Example 28/29.40% Versify ™ DE 3300.01/2.00% Kemamide E Ultra | 1.00 | 2.50 | 9.02 | 1805 | 766 | 0.11 | 451 | 0.25 | 8.48 | 328 |
| 29.40% Polymer Example 28/68.60% LDPE 722/2.00% Kemamide E Ultra | 1.00 | 2.50 | 21.88 | 3813 | 1351 | 0.109 | 918 | 0.25 | 7.04 | 802 |
| 49.00% Polymer Example 28/49.00% LDPE 722/2.00% Kemamide E Ultra | 1.00 | 2.50 | 16.00 | 2866 | 1036 | 0.111 | 808 | 0.25 | 7.16 | 574 |
| 68.60% Polymer Example 28/29.40% LDPE 722/2.00% Kemamide E Ultra | 1.00 | 2.50 | 10.40 | 1991 | 762 | 0.111 | 499 | 0.25 | 7.41 | 374 |
| 55.76% Polymer Example 27/42.24% LLDPE 2517/2.00% Kemamide E Ultra | 1.00 | 2.50 | 13.74 | 619 | 206 | 0.114 | 1218 | 0.25 | 7.60 | 481 |
| 68.60% Polymer Example 28/29.40% Septon ® 4055/2.00% Kemamide E Ultra | 1.00 | 2.50 | 4.70 | 318 | 137 | 0.118 | 1251 | 0.25 | 6.02 | 159 |
| 75.65% Polymer Example 28/13.35% Versify ™ 3000.01/09.00% Elvax ® 650Q/2.00% Kemamide E Ultra | 1.00 | 2.50 | 8.02 | 485 | 168 | 0.108 | 384 | 0.25 | 8.20 | 296 |
| 75.65% Polymer Example 28/13.35% Versify ™ 3000.01/09.00% Elvax ® 750/2.00% Kemamide E Ultra | 1.00 | 2.50 | 7.84 | 471 | 169 | 0.113 | 440 | 0.25 | 7.15 | 278 |
| 43.80% Polymer Example 26/29.20% Septon ® 4055/25.00% Affinity ® GA 1950/2.00% Kemamide E Ultra | 1.00 | 2.50 | 5.02 | 302 | 137 | 0.121 | 1364 | 0.25 | 5.89 | 167 |
| 43.80% Polymer Example 26/29.20% Septon ® 8006/25.00% Affinity ® GA 1950/2.00% Kemamide E Ultra | ND | ND | ND | ND | ND | ND | ND | ND | ND | ND |
| 68.60% Polymer Example 28/29.40% DMDA-8007/2.00% Kemamide E Ultra | 1.00 | 2.50 | 15.08 | 682 | 223 | 0.11 | 567 | 0.25 | 7.02 | 551 |
| 68.60% Polymer Example 28/29.40% hPP H700-12/2.00% Kemamide E Ultra | 1.00 | 2.50 | 10.98 | 567 | 0 | 0.113 | 460 | 0.25 | 7.76 | 389 |
| 88.20% Polymer Example 28/09.80% hPP H700-12/2.00% Kemamide E Ultra | 1.00 | 2.50 | 5.76 | 407 | 151 | 0.109 | 398 | 0.25 | 5.77 | 212 |
| 71.52% Polymer Example 26/26.48% DMDA-8965/2.00% Kemamide E Ultra | 1.00 | 2.50 | 14.44 | 676 | 257 | 0.12 | 1721 | 0.25 | 7.36 | 482 |
| 75.65% Polymer Example 28/13.35% Versify ™ 3000.01/2.00% Kemamide E Ultra | 1.00 | 2.50 | 7.54 | 472 | 169 | 0.11 | 463 | 0.25 | 7.03 | 275 |
| 48.00% Polymer Example 28/48.00% LDPE 722/4.00% MB-50-002 | ND | ND | ND | ND | ND | ND | ND | ND | ND | ND |
| 98.00% AFFINITY ® SM 1300G/2.00% Kemamide E Ultra | 1.00 | 2.50 | 18.22 | 939 | 295 | 0.107 | 1566 | 0.25 | 7.65 | 682 |
| 98.00% Elvax ® 650Q/2.00% Kemamide E Ultra | 1.00 | 2.50 | 17.18 | 876 | 296 | 0.109 | 1377 | 0.25 | 8.56 | 628 |

TABLE 13-continued

Polymer properties for exemplary polymer blends

| Blend Composition | Avg Adj Gage Len1 (In) | Avg Adj Gage Len2 (In) | Avg Off Yield Load (Lb) | 100% Modulus | 300% Modulus | Avg Thickness (In) | Avg Ultimate (Psi) | Avg Width (In) | Avg Yield Strain (%) | Avg Yield Strength (Psi) |
|---|---|---|---|---|---|---|---|---|---|---|
| 68.60% Polymer Example 26/29.40% Septon ® 4055/2.00% Kemamide E Ultra | 1.00 | 2.50 | 5.52 | 337 | 162 | 0.124 | 1615 | 0.25 | 7.69 | 178 |
| 49.80% Polymer Example 26/33.20% Septon ® 4055/15.00% Affinity ® GA 1950/ 2.00% Kemamide E Ultra | 1.00 | 2.50 | 4.72 | 316 | 149 | 0.12 | 1435 | 0.25 | 6.13 | 158 |

ND = Not determined

As seen from the data provided in Tables 12 and 13, various physical properties, including compression set, abrasion resistance, were improved, while maintaining a low Shore hardness value in the polymer blends comprising at least one ethylene/α-olefin interpolymer. Such properties are especially useful in forming the gaskets and closures provided herein.

In some embodiments, the addition of a carboxylic acid copolymer and/or amide slip agents enhances some of these performance properties.

Another improvement is a more puncture resistant surface. Using a microscope and a metal probe, the puncture resistance of the surface on a series of closure liners is observed. The surface of closure liners (contained Surly™ 1702) do not break until the probe penetrates about 4 mils into the liner. Conversely, the surface of closure liners without any ethylene/carboxylic acid in the formulation break almost immediately upon penetration.

The surface of liners containing the ethylene/carboxylic acid copolymer always respond differently to the polarized light, implying that the surface is more crystalline and/or more oriented; both of which would result in a more puncture resistant surface. The addition of these components improves the "stringing and scuffing" resistance of the liner because of enhanced slip performance and a more puncture resistant skin layer.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A polymer blend composition comprising:
(A) at least one ethylene/α-olefin interpolymer and (B) at least one other polymer, wherein the ethylene/α-olefin interpolymer is a block interpolymer and:
(a) has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m > -2002.9 + 4538.5(d) - 2422.2(d)^2, \text{ or}$$

(b) has a $M_w/M_n$ from about 1.7 to about 3.5, and is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1; or (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (g) an average block index greater than zero and up to about 1.0 and a molecular weight distribution, Mw/Mn, greater than about 1.3.

2. The composition of claim 1, wherein the other polymer is selected from a second ethylene/α-olefin interpolymer, an elastomer, a polyolefin, a polar polymer, and an ethylene/carboxylic acid interpolymer or ionomer thereof, the second ethylene/α-olefin interpolymer is different than the first ethylene/α-olefin interpolymer and the second ethylene/α-olefin interpolymer:
(a) has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$T_m > -2002.9 + 4538.5(d) - 2422.2(d)^2$, or (b) has a $M_w/M_n$ from about 1.7 to about 3.5, and is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1; or (f) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (g) an average block index greater than zero and up to about 1.0 and a molecular weight distribution, Mw/Mn, greater than about 1.3.

3. The composition of claim 2, wherein the first ethylene/α-olefin interpolymer is present in an amount ranging from about 9% to 99.5% and the second ethylene/α-olefin interpolymer is present in an amount ranging from about 9% to 99.5% by weight of the total weight of the composition.

4. The composition of claim 1, wherein the other polymer is an elastomer selected from a thermoplastic vulcanizate, styrenic block copolymer, neoprene, functionalized elastomers, polybutadiene rubber, butyl rubber or a combination thereof.

5. The composition of claim 1, wherein the other polymer is a polyolefin selected from LDPE, LLDPE, HDPE, EVA, EAA, EMA, ionomers thereof, metallocene LLDPE, impact grade propylene polymer, random grade propylene polymer, polypropylene and a combination thereof.

6. The composition of claim 1, wherein the other polymer is a polar polymer selected from nylon, polyamide, ethylene vinyl acetate, polyvinyl chloride, acrylonitrile/butadiene/styrene (ABS) copolymers, aromatic polycarbonate, ethylene/carboxylic acid copolymers, polyacrylic and a combination thereof.

7. The composition of claim 1, wherein the other polymer is an olefin/carboxylic acid interpolymer selected from ethylene-acrylic acid copolymer, ethylene-methacrylic acid copolymer, ethylene-itaconic acid copolymer, ethylene-methyl hydrogen maleate copolymer, ethylene-maleic acid copolymer, ethylene-acrylic acid copolymer, ethylene-methacrylate copolymer, ethylene-methacrylic acid-ethacrylate copolymer, ethylene-itaconic acid-methacrylate copolymer, ethylene-itaconic acid-methacrylate copolymer, ethylene-methyl hydrogen maleate-ethyl acrylate copolymer, ethylene-methacrylic acid-vinyl acetate copolymer, ethylene-acrylic acid copolymer, ethylene-acrylic acid-vinyl alcohol copolymer, ethylene-acrylic acid-carbon monoxide copolymer, ethylene-propylene-acrylic acid copolymer, ethylene-methacrylic acid-acrylonitrile copolymer, ethylene-fumaric acid-vinyl methyl ether copolymer, ethylene-vinyl chloride-acrylic acid copolymer, ethylene-vinylidene chloride-acrylic acid copolymer, ethylene-vinylidene chloride-acrylic acid copolymer,ethylene-vinyl fluoride-methacrylic acid copolymes, ethylene-chlorotrifluoroethlyene-methacrylic acid copolymer, or a combination thereof.

8. The composition of claim 1, further comprising an additive selected from a slip agent, an anti-blocking agent, a plasticizer, an antioxidant, a UV stabilizer, a colorant, a filler, a lubricant, an antifogging agent, a flow aid, a acoupling agent, a cross-linking agent, a nucleating agent, a surfactant, a solvent, a flame retardant, an antistatic agent, an extender, an odor absorber, a barrier resin and a combination thereof.

9. The composition of claim 8, wherein the slip agent is polymethylsiloxane, erucamide, oleamide or a combination thereof.

10. The composition of claim 8, wherein the odor absorber is calcium carbonate, activated charcoal or a combination thereof.

11. The composition of claim 8, wherein the baffler resin is ethylene vinyl alcohol (EVOH) copolymer or polyvinylidene chloride (PVDC).

12. The composition of claim 8, wherein the extender is a mineral oil, polybutene, siloxane, or a combination thereof.

13. A gasket comprising the composition of claim 1.

* * * * *